United States Patent
Trotsky

(10) Patent No.: US 9,581,291 B2
(45) Date of Patent: Feb. 28, 2017

(54) POSITIONING GRIP FOR A MOBILE ELECTRONIC DEVICE

(71) Applicant: Octa LLC, Denver, CO (US)

(72) Inventor: Kevin Trotsky, Denver, CO (US)

( * ) Notice: Subject to any disclaimer, the term of this patent is extended or adjusted under 35 U.S.C. 154(b) by 0 days.

(21) Appl. No.: 13/710,450

(22) Filed: Dec. 10, 2012

(65) Prior Publication Data

US 2013/0206942 A1  Aug. 15, 2013

Related U.S. Application Data

(63) Continuation-in-part of application No. PCT/US2011/045921, filed on Jul. 29, 2011.

(60) Provisional application No. 61/503,240, filed on Jun. 30, 2011, provisional application No. 61/424,973, filed on Dec. 20, 2010, provisional application No. 61/400,520, filed on Jul. 29, 2010, provisional application No. 61/414,747, filed on Nov. 17, 2010, provisional application No. 61/709,321, filed on Oct. 3, 2012.

(51) Int. Cl.
| | |
|---|---|
| *F16M 11/10* | (2006.01) |
| *F16M 11/04* | (2006.01) |
| *F16M 11/40* | (2006.01) |
| *F16M 13/04* | (2006.01) |
| *F16M 13/02* | (2006.01) |
| *F16M 13/00* | (2006.01) |

(52) U.S. Cl.
CPC ........ *F16M 13/022* (2013.01); *F16M 11/041* (2013.01); *F16M 11/10* (2013.01); *F16M 11/105* (2013.01); *F16M 11/40* (2013.01); *F16M 13/00* (2013.01); *F16M 13/04* (2013.01); *F16M 2200/028* (2013.01); *Y10T 29/49826* (2015.01)

(58) Field of Classification Search
CPC ...... F16M 11/041; F16M 11/10; F16M 11/40; F16M 13/00; F16M 13/022; F16M 13/04
USPC .... 248/682, 688, 689, 441.1, 448, 451, 126, 248/316.1, 316.4, 924; 361/679.56, 361/679.57, 679.55
See application file for complete search history.

(56) References Cited

U.S. PATENT DOCUMENTS

| | | |
|---|---|---|
| 1,071,428 A | 8/1913 | Jones |
| 4,580,751 A | 4/1986 | Panzer |
| 5,087,005 A | 2/1992 | Holoff et al. |
| 5,133,076 A | 7/1992 | Hawkins et al. |
| 5,788,202 A * | 8/1998 | Richter ............... B60R 11/0241 224/570 |

(Continued)

OTHER PUBLICATIONS

Notice of Allowance (with English translation) for Chinese Patent Application No. 201330240914.1 dated Oct. 31, 2013, 5 pages.

(Continued)

*Primary Examiner* — Jonathan Liu
*Assistant Examiner* — Muhammad Ijaz
(74) *Attorney, Agent, or Firm* — Sheridan Ross P.C.

(57) ABSTRACT

An electronic device interface is provided that is selectively interconnectable to a portable electronic device. The interface is preferably interconnected to the portable electronic device via inwardly-biased arms that end in fingers that engage opposing edges or corners of the portable electronic device. The interface may receive a positioning grip that includes a support having at least one selectively deflectable surface.

6 Claims, 35 Drawing Sheets

(56) References Cited

U.S. PATENT DOCUMENTS

| | | | |
|---|---|---|---|
| 5,836,563 A * | 11/1998 | Hsin-Yung | B60R 11/0241 248/316.4 |
| 5,894,705 A | 4/1999 | Sutton | |
| 5,903,645 A * | 5/1999 | Tsay | B60R 11/0241 248/316.4 |
| 5,915,661 A | 6/1999 | Silverman et al. | |
| 5,979,940 A * | 11/1999 | Araghi | A47B 23/06 248/441.1 |
| 6,149,116 A * | 11/2000 | Won | B60R 11/0241 224/553 |
| 6,308,923 B1 | 10/2001 | Howard | |
| 6,646,864 B2 | 11/2003 | Richardson | |
| 6,648,285 B1 | 11/2003 | Woollen | |
| 6,666,420 B1 | 12/2003 | Carnevali | |
| 6,672,558 B2 | 1/2004 | Li | |
| 6,788,527 B2 | 9/2004 | Doczy et al. | |
| 6,856,506 B2 | 2/2005 | Doherty et al. | |
| 7,021,593 B1 | 4/2006 | Fan | |
| 7,150,538 B2 | 12/2006 | Horst | |
| D548,688 S | 8/2007 | Fee et al. | |
| 7,272,984 B2 * | 9/2007 | Fan | B60R 11/02 248/231.61 |
| D554,847 S | 11/2007 | Schmelzer et al. | |
| 7,312,984 B2 | 12/2007 | Richardson et al. | |
| 7,343,184 B2 | 3/2008 | Rostami | |
| D570,836 S | 6/2008 | Chen | |
| 7,380,759 B1 | 6/2008 | Whiteside et al. | |
| 7,441,734 B2 * | 10/2008 | Liou | B60R 11/02 248/205.5 |
| 7,453,436 B2 | 11/2008 | Ruiz | |
| 7,469,868 B2 | 12/2008 | Bury | |
| D592,188 S | 5/2009 | Huang | |
| 7,537,190 B2 * | 5/2009 | Fan | B60R 11/02 248/309.1 |
| D594,404 S | 6/2009 | Kuo et al. | |
| 7,551,458 B2 * | 6/2009 | Carnevali | B60R 11/0252 174/520 |
| 7,564,679 B2 | 7/2009 | Chen et al. | |
| D600,907 S | 9/2009 | Boyd et al. | |
| 7,588,331 B2 | 9/2009 | Burnstein | |
| 7,612,997 B1 | 11/2009 | Diebel et al. | |
| 7,614,595 B2 * | 11/2009 | Richter | B60R 11/0241 248/309.1 |
| 7,634,082 B2 | 12/2009 | Medhin | |
| 7,635,111 B2 | 12/2009 | Hara et al. | |
| 7,661,638 B2 | 2/2010 | Yu | |
| 7,673,914 B2 | 3/2010 | Liao | |
| 7,675,609 B2 | 3/2010 | Hinchliff et al. | |
| 7,698,836 B2 | 4/2010 | Schmelzer et al. | |
| D615,078 S | 5/2010 | Bradley | |
| 7,712,712 B2 | 5/2010 | Richter | |
| 7,712,720 B1 * | 5/2010 | Cheng | B60R 11/00 248/205.5 |
| 7,729,493 B2 | 6/2010 | Krieger et al. | |
| 7,793,462 B1 | 9/2010 | Sherette | |
| 7,850,133 B2 | 12/2010 | Carnevali | |
| D637,593 S | 5/2011 | Zanetti | |
| 7,967,269 B2 * | 6/2011 | Liu | G03B 21/58 248/176.3 |
| 7,987,816 B1 | 8/2011 | Walsh | |
| D645,818 S | 9/2011 | Guccione et al. | |
| 8,066,241 B2 | 11/2011 | Yu et al. | |
| D652,836 S | 1/2012 | Voorhees | |
| 8,104,809 B1 | 1/2012 | Mayhugh | |
| D656,895 S | 4/2012 | Fitch | |
| D660,306 S | 5/2012 | Voorhees | |
| 8,240,628 B2 * | 8/2012 | Huang | F16M 11/04 248/122.1 |
| 8,262,070 B2 * | 9/2012 | Liu | B60R 11/0241 269/254 R |
| 8,294,014 B2 | 10/2012 | Voorhees | |
| D673,960 S | 1/2013 | Lindfield et al. | |
| D674,804 S | 1/2013 | Cote | |
| 8,413,943 B1 | 4/2013 | Li | |
| 8,480,044 B2 | 7/2013 | Liao | |
| D687,440 S | 8/2013 | Shieh | |
| 8,550,317 B2 | 10/2013 | Hyseni | |
| 8,567,737 B2 * | 10/2013 | Chen | F16M 11/041 248/313 |
| 8,672,374 B1 | 3/2014 | Webber | |
| D703,657 S | 4/2014 | Carnevali | |
| 8,777,173 B2 * | 7/2014 | Nemoto | B60R 11/02 224/929 |
| 2002/0174620 A1 | 11/2002 | Binnebose et al. | |
| 2004/0226973 A1 | 11/2004 | Kao | |
| 2005/0092877 A1 | 5/2005 | Carnevali | |
| 2005/0101182 A1 | 5/2005 | Nakamura et al. | |
| 2005/0200608 A1 | 9/2005 | Ulla et al. | |
| 2005/0236536 A1 * | 10/2005 | Fan | B60R 11/02 248/176.3 |
| 2006/0278788 A1 * | 12/2006 | Fan | B60R 11/02 248/309.1 |
| 2007/0262223 A1 * | 11/2007 | Wang | B60R 11/0241 248/346.07 |
| 2008/0087782 A1 | 4/2008 | Sutherland et al. | |
| 2008/0192410 A1 * | 8/2008 | Kumar | G06F 1/1632 361/679.4 |
| 2008/0217493 A1 | 9/2008 | Bevirt | |
| 2009/0050658 A1 | 2/2009 | Boyd et al. | |
| 2009/0184220 A1 | 7/2009 | Takahashi et al. | |
| 2009/0205759 A1 | 8/2009 | Vaccarella | |
| 2009/0294617 A1 * | 12/2009 | Stacey | B60R 11/02 248/316.1 |
| 2010/0047604 A1 | 2/2010 | Stratton-Metzger | |
| 2010/0096517 A1 | 4/2010 | Lampman et al. | |
| 2010/0123062 A1 | 5/2010 | Jones et al. | |
| 2010/0220992 A1 | 9/2010 | Bevirt | |
| 2010/0221062 A1 | 9/2010 | Bevirt | |
| 2010/0243850 A1 * | 9/2010 | Derry | F16M 11/10 248/372.1 |
| 2010/0294908 A1 | 11/2010 | Mish et al. | |
| 2010/0296235 A1 | 11/2010 | Takemasa et al. | |
| 2011/0130782 A1 * | 6/2011 | Kan | A61B 5/1411 606/182 |
| 2011/0279959 A1 | 11/2011 | Lopez | |
| 2012/0025684 A1 | 2/2012 | Trotsky | |
| 2012/0074272 A1 * | 3/2012 | Hull | F16M 11/041 248/122.1 |
| 2012/0104185 A1 | 5/2012 | Carroll | |
| 2012/0312936 A1 * | 12/2012 | Huang | F16M 11/041 248/122.1 |
| 2013/0092811 A1 * | 4/2013 | Funk | F16M 13/02 248/371 |
| 2013/0148273 A1 * | 6/2013 | Tsai | F16M 11/041 361/679.01 |

OTHER PUBLICATIONS

Official Action (with English translation) for Korean Patent Application No. 30-2013-0029825 dated Nov. 5, 2013, 4 pages.
U.S. Appl. No. 13/710,436, filed Dec. 10, 2012, Trotsky.
International Search Report for International (PCT) App. No. PCT/US2011/045921, mailed Jan. 19, 2012, 5 pages.
Written Opinion for International (PCT) App. No. PCT/US2011/045921, mailed Jan. 19, 2012, 7 pages.
International Preliminary Report on Patentability for International (PCT) Patent Application No. PCT/US2011/045921, mailed Feb. 7, 2013 9 pages.
Notice of Allowance (with English translation) for Japanese Patent Application No. 2013-013088 mailed Jan. 24, 2014, 2 pages.
Official Action for U.S. Appl. No. 13/710,436, mailed Sep. 30, 2014, 18 pages.
Official Action for U.S. Appl. No. 13/710,436, mailed Mar. 4, 2015 24 pages.
Official Action for U.S. Appl. No. 29/448,751, mailed Aug. 29, 2014, 14 pages.

(56) References Cited

OTHER PUBLICATIONS

Notice of Allowance for U.S. Appl. No. 29/448,751, mailed Nov. 12, 2014, 9 pages.

* cited by examiner

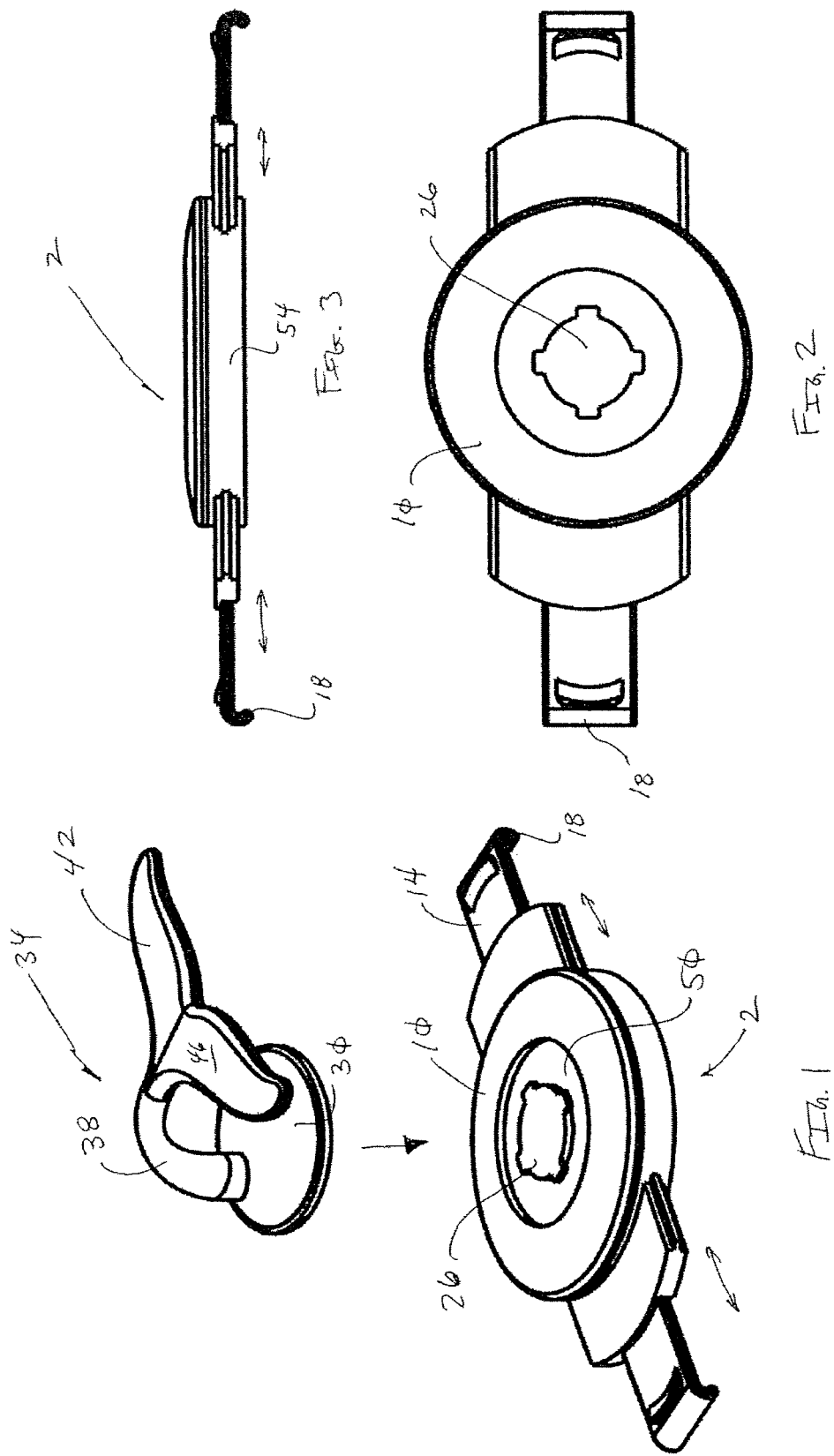

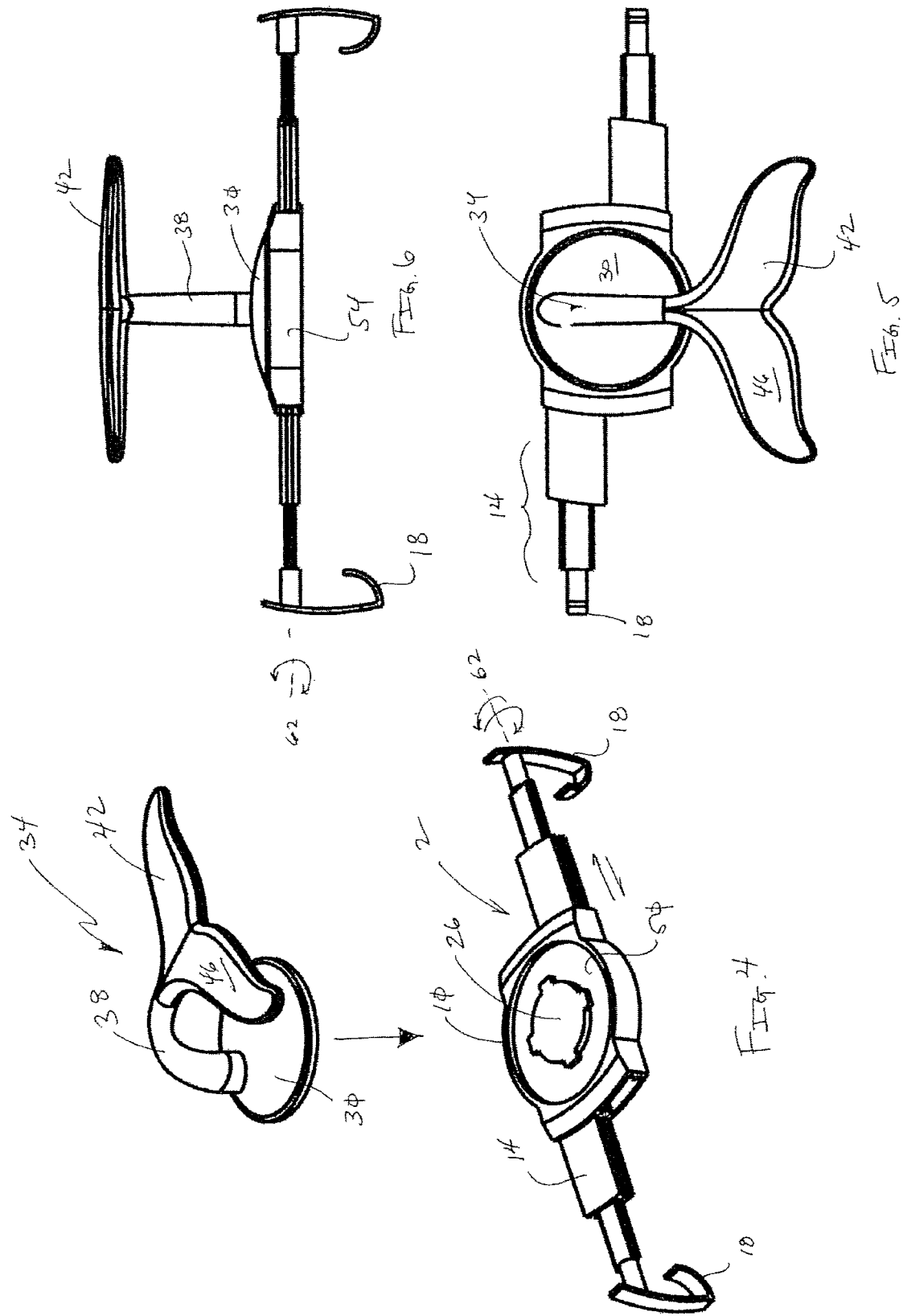

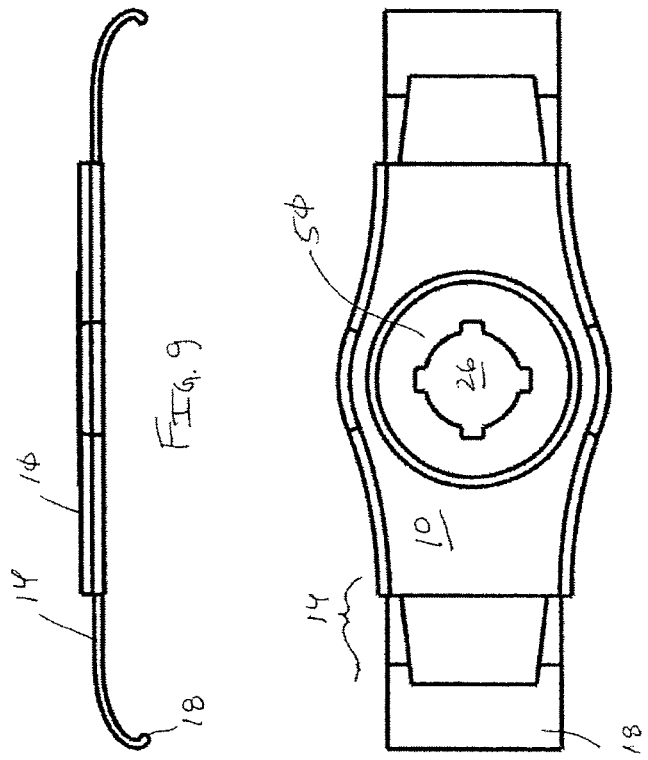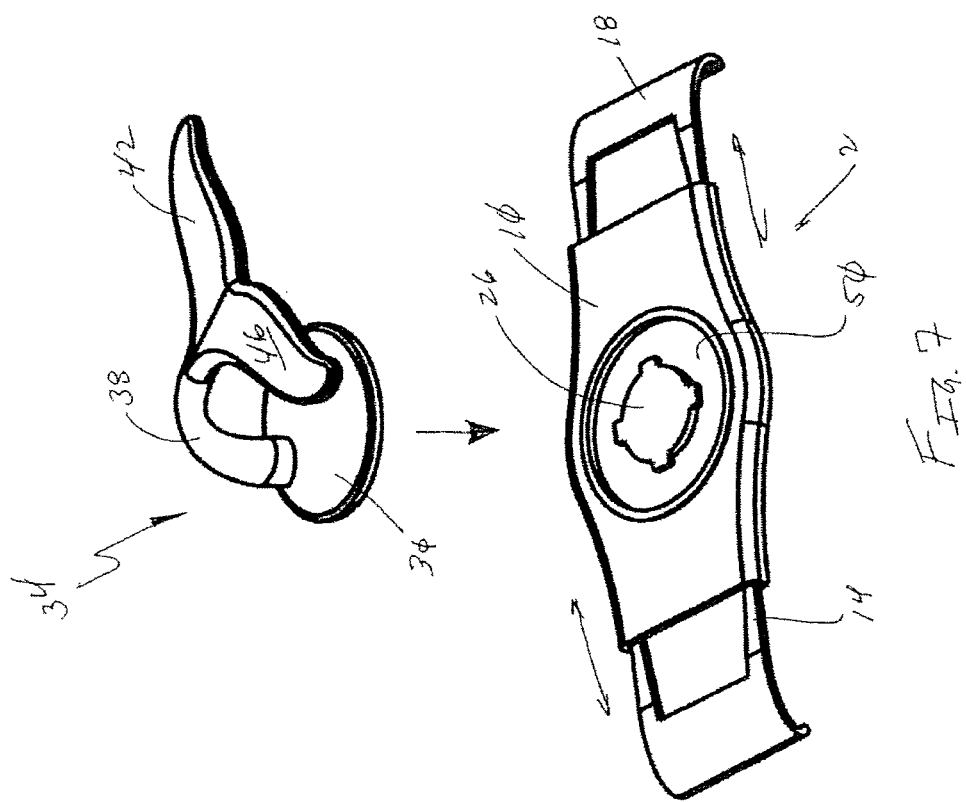

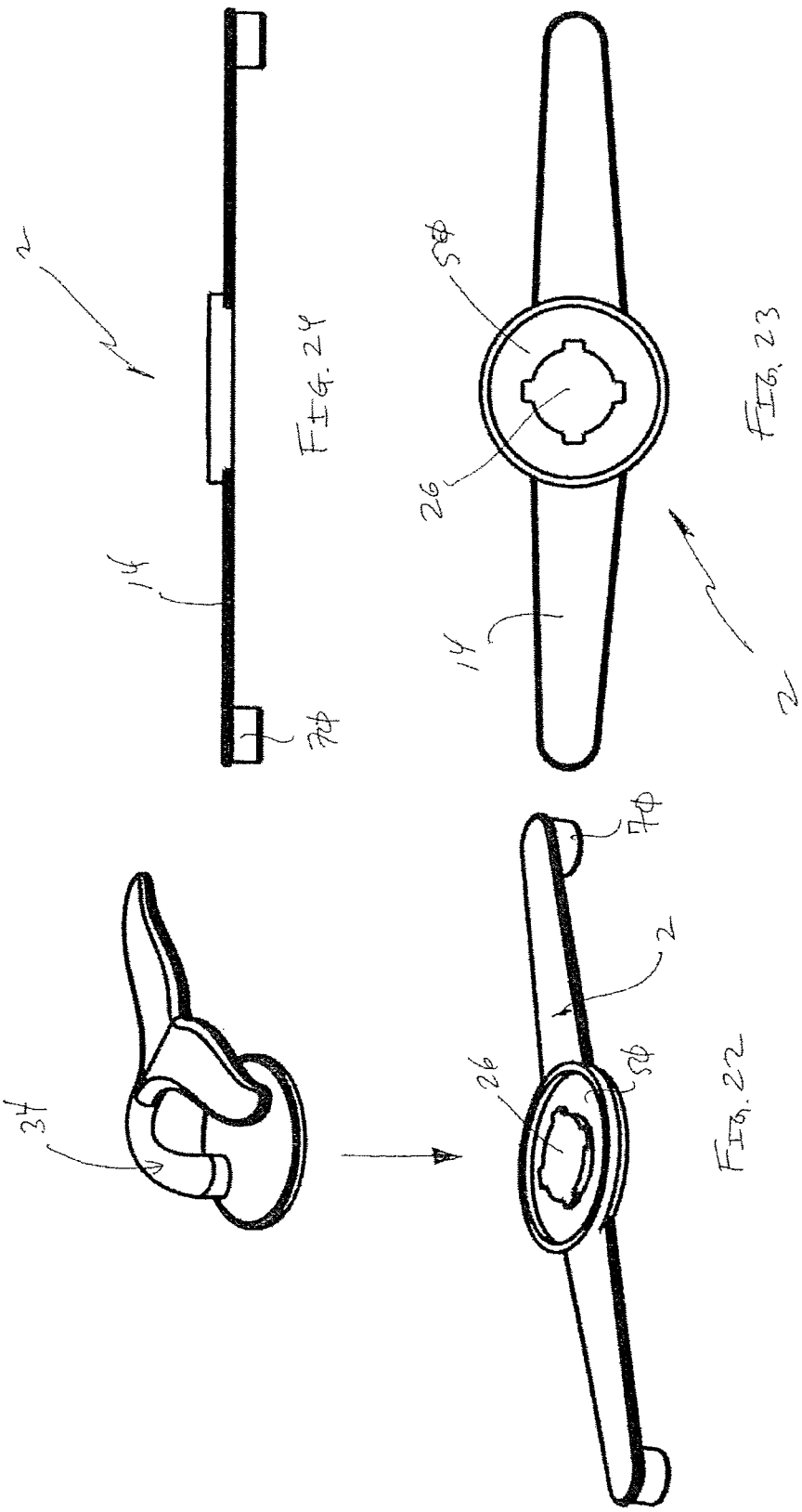

POSITIONING GRIP FOR A MOBILE ELECTRONIC DEVICE

This application is a Continuation-In-Part of PCT application No. PCT/US2011/045921, filed with the WIPO on Jul. 29, 2011, which designates the United States, and which claims the benefit of U.S. Provisional Patent Application Ser. No. 61/503,240, filed Jun. 30, 2011, U.S. Provisional Patent Application Ser. No. 61/424,973, filed Dec. 20, 2010, U.S. Provisional Patent Application Ser. No. 61/400,520, filed Jul. 29, 2010, and U.S. Provisional Patent Application Ser. No. 61/414,747, filed Nov. 17, 2010, the entire disclosures of which are incorporated by reference herein.

This application also claims the benefit of U.S. Provisional Patent Application Ser. No. 61/709,321, filed Oct. 3, 2012, the entire disclosure of which is incorporated by reference herein.

FIELD OF THE INVENTION

Embodiments of the present invention generally relate to a device for selective interconnection to a mobile electronic device to enhance the use thereof. More specifically, one embodiment of the present invention is a user interface able to selectively interconnect to an electronic device and allow the electronic device to be selectively positioned.

BACKGROUND OF THE INVENTION

Portable electronic devices, such as tablet computers, netbooks, readers, iPads®, Kindles®, personal computers, communication devices, and other similar mobile devices (hereafter "electronic device") have become increasingly popular. One drawback of these devices is that their size, shape and/or surface texture often renders them difficult to hold and tilt to an acceptable viewing angle. More specifically, it is often desirable to tilt the electronic device to enhance readability or functionality, which is usually done by hand. Those familiar with such devices will appreciate that after time, the user may become fatigued, which results in the reduction of holding force and associated stability. Holding an electronic device also does not permit the use of one or both hands for other activities that may be related to the functions being performed by an electronic device, e.g. typing. Further, some electronic devices are small, sleek, and have smooth surfaces, and are thus difficult to grasp.

Thus, it is desirable to provide a grip, i.e., a tactile user interface, for selective interconnection to the electronic device to facilitate holding and positioning thereof. Embodiments of the present invention, which will be described in detail below, provide a user interface for selective interconnection to an electronic device that allows static or dynamic user interaction with the associated electronic device, which also allows the electronic device to be used in a hands-free manner.

SUMMARY OF THE INVENTION

It is one aspect of the present invention to provide a multi-functional gripping device that provides an ergonomic and efficient way to hold an electronic device that also functions as a highly versatile and functional stand. Thus, it is one aspect of the present invention to provide a selectively interconnectable grip with an ergonomic and comfortable shape.

It is another aspect of the present invention to provide an interface for receiving a grip that selectively interconnects to an electronic device. More specifically, one embodiment of the present invention employs an electronic device interface ("interface") for selective interconnection to the electronic device. The interface includes a docking portion with arms that operably extend therefrom. The arms may extend in a telescoping manner from the interface and may retract, at least partially, within a cavity provided by the interface when not in use. Fingers or other gripping devices are associated with the end of each arm that engage opposite edges or corners of the electronic device.

In operation, a user positions the interface onto the back of the electronic device and extends the arms and engages the fingers onto the edges or corners of the electronic device. It is contemplated that at least one arm is automatically retractable, i.e., spring-biased, or retract similar to a metallic tape measure. The arms may also be configured to be manually returned into the dock. When released, the arms will retract and exert a compressive force on the electronic device. The compressive force generated by the opposing fingers securely interconnects the interface to the electronic device. A positioning grip may also be selectively associated with the dock.

More specifically, it is another aspect of the present invention to provide a grip that transforms into a stand for positioning the electronic device at various viewing angles. Some examples of viewing angles include those normally associated with portrait viewing, portrait typing, landscape viewing, and landscape typing. The flexibility and selective interconnectability of embodiments of the present invention will allow the electronic device to be positioned in many ways. The grip of one embodiment of the present invention also employs a support having flexible positionable arms and/or surfaces that will allow the electronic device to comfortably rest on the user's lap, for example.

It is another aspect of the present invention to provide a grip that is ergonomic and easy to use. To access stored arms of one embodiment, at least one button is pressed that causes the arms to deploy from the dock. Further, the dock is shaped with curves that correspond to the human hand and that minimizes snag points. Foam over-molded or cushioned material will cover the dock of some embodiments of the present invention which maximizes user comfort. In addition, the positioning grips used in conjunction with some embodiments of the present invention are adapted to rest in a user's hand wherein a stem portion, which extends from a base portion, is placed between the user's fingers or grasped in their fist. In the former example, the base rests comfortably in the user's palm with the stem positioned between two of the user's digits. The base and grip may also be made of a comfortable, spongy, or deformable material that allows for the user to alter the contour thereof to enhance comfort. Still other embodiments of the present invention include a base with a plurality of finger indentations to enhance the user's comfort. Preferably, however, the base is somewhat smooth such that the attached electronic device may be rotated at will with the base "floating" in the user's palm.

In a related aspect of the present invention, portions of the grip are made of a specialized material. More specifically, some flexible materials will return to a primary shape when exposed to heat. Thus, some embodiments of the present invention are made of these "memory materials" wherein the grip, support, and base may be selectively altered and formed to fit the user's preference. It is envisioned that the temperature in which this material will return to its primary shape is higher or lower than about 98.6° F. When a user desires to return the grip to its primary shape, the grip may be placed in the refrigerator or in heated water. Still other embodiments of the present invention are made of a resiliently deflectable material that a user can form and shape and then set permanently by exposure to a preselected temperature. In one embodiment of the present invention, the primary shape of the grip, base, and support associated with the positioning grip changes when exposed to heat, generated from the user or from the attached electrical device.

It is one aspect of the present invention to provide a positioning grip that is adapted to rotate, translate, and/or tilt. More specifically, one embodiment of the present invention is rotatably interconnected to the dock. Thus the base and associated grip and support are adapted to rotate relative to a fixed portion of the dock. Those of skill in the art will appreciate that the rotated orientation of the electronic device may be selectively fixed by actuation of a locking mechanism integrated into the dock that would prevent further rotation of the interconnected electronic device. In one embodiment, the rotational lock is actuated by a user's thumb or finger. Similarly, one embodiment of the present invention allows the interconnected electronic device to tilt relative to the positioning grip. For example, the dock may include a hinge mechanism that allows the electronic device to be angulated relative to the grip. Again, a desired angle may be fixed by actuation of a locking mechanism associated with the dock or positioning grip. The tilting/rotating mechanism described herein may be combined into one system that allows for rotation, translation, and angulation of the interconnected electronic device relative to the grip or dock.

It is another aspect of embodiments of the present invention to provide a positioning grip that allows for secure interconnection to a horizontal or vertical surface. More specifically, one embodiment of the present invention includes a support that is interconnected to the dock. The support also has a mechanism for interconnecting to a horizontal or vertical surface. For example, the support may be connected to a suctioning dock or clamp for interconnection to a horizontal or vertical surface. The support may be in the form of an elongated and selectively-positionable member. This embodiment of the present invention can be used in automobiles, on airplane tray tables, etc. such that one end of the positioning grip is fixed and unable to move relative to the interconnected surface, but the position of the interconnected electronic device can be selectively altered. Other embodiments of the present invention include a support with a bulbous end that interfaces into a cavity of a fixed base that is placed on, or integrated into, a table or wall that allows for selective and operable securement of the support and, thus, the electronic device. The bulbous nature of the support may also provide a swiveling interconnection that allows the electronic device to be moved in three degrees of freedom relative to the fixed interconnection point. The dock may, alternatively, be interconnected to a fixed receiving member that is attached to the back of a car seat, a dash board, a wall, a table, a tripod, a telescoping stand, an articulating stand (as often used in conjunction with lamps), etc.

It is still yet another aspect of embodiments of the present invention to provide a device for selectively positioning an electronic device, comprising: a dock having a top portion and a bottom portion with a cavity therebetween; a first primary arm operatively interconnected to the dock such that the first primary arm is capable of selectively receipt within the cavity; a second primary arm operatively interconnected to the dock such that the second primary arm is capable of selectively receipt within the cavity; a first finger rotatably interconnected to an outer end of the first primary arm that is adapted for interconnection to an edge of the electronic device; a second finger rotatably interconnected to an outer end of the second primary arm that is adapted for interconnection to an edge of the electronic device; and wherein the bottom portion of the dock is adapted to be engaged onto or adjacent to a back surface of the electronic device and the first finger and the second finger are adapted to be engaged to an edge of the electronic device.

It is another aspect of embodiments of the present invention to provide a device for selectively positioning an electronic device, comprising: a dock; a first means for extending operably interconnected to the dock, the first means for extending having a first end associated with the dock and a second end that has a means for interconnecting that is adapted to engage an edge of the electronic device, the first means for extending may concealed within the dock; a second means for extending operably interconnected to the dock, the second means for extending having a first end associated with the dock and a second end that has a means for interconnecting that is adapted to engage an edge of the electronic device, the second means for extending may concealed within the dock; and wherein the dock is adapted to be engaged onto the back surface of the electronic device and the second end of the first arm and the second end of the second arm are engaged to the edge of the electronic device.

It is another aspect of embodiments of the present invention to provide a method of securing an electronic device interface to an electronic device, the electronic device interface comprising a dock, a first primary arm that is selectively deployable from the dock, and a second primary arm that is selectively deployable from the dock, comprising: positioning the dock against a rear surface of the electronic device; extending the first primary arm from the dock; extending the second primary arm from the dock; deploying a first finger from the first primary arm; deploying a second finger from the second primary arm; engaging the electronic device with the first finger and the second finger; and locking the first primary arm and the second primary arm relative to the dock.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 1 is an exploded perspective view of an electronic device interface and associated positioning grip of one embodiment of the present invention;

FIG. 2 is a top plan view of the electronic device interface shown in FIG. 1;

FIG. 3 is a side elevation view of FIG. 2;

FIG. 4 is an exploded perspective view of an electronic device interface and associated positioning grip of another embodiment of the present invention;

FIG. 5 is a top plan view of FIG. 4;

FIG. 6 is a front elevation view of FIG. 5;

FIG. 7 is an exploded perspective view of an electronic device interface and associated positioning grip of another embodiment of the present invention;

FIG. 8 is a top plan view of the electronic device interface shown in FIG. 7;

FIG. 9 is a front elevation view of FIG. 8;

FIG. 22 is an exploded perspective view of an electronic device interface and associated positioning grip of another embodiment of the present invention;

FIG. 23 is a top plan view of the electronic device interface of FIG. 22;

FIG. 24 is a front elevation view of FIG. 23;

FIG. 53 is a perspective view showing the electronic device interface of FIG. 43 interconnected to an electronic device;

Figure 10:
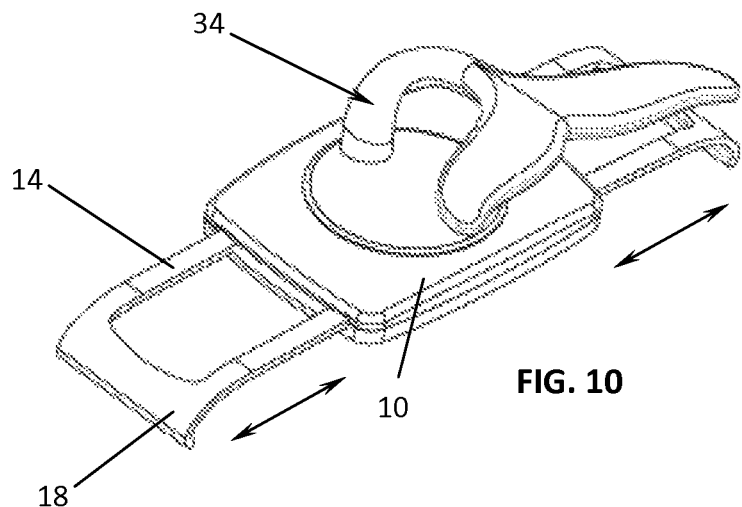
FIG. 10 is a perspective view of an electronic device interface with interconnected positioning grip, similar to that shown in FIG. 7.
Figure 11:
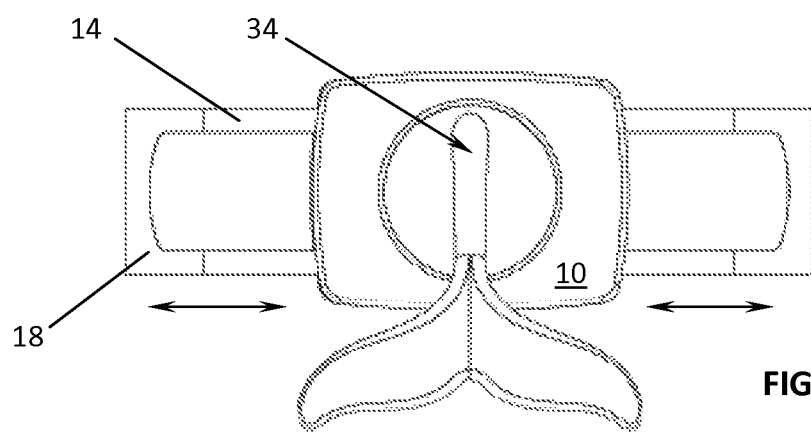
FIG. 11 is a top plan view of FIG. 10.
Figure 12:
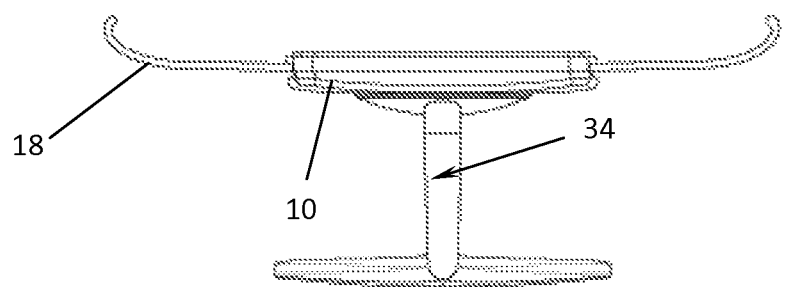
FIG. 12 is a front elevation view of FIG. 10.

To assist in the understanding of one embodiment of the present invention, the following list of components and associated numbering found in the drawings is provided herein:

| # | Component |
|---|---|
| 2 | Electronic device interface |
| 6 | Electronic device |
| 10 | Dock |
| 14 | Arm |
| 18 | Finger |
| 22 | Edge |
| 26 | Fitting |
| 30 | Base |
| 34 | Grip |
| 38 | Stem |
| 42 | Support |

-continued

| # | Component |
|---|---|
| 46 | Positionable surface |
| 50 | Recess |
| 54 | Cavity |
| 58 | Back surface |
| 62 | Longitudinal axis |
| 66 | Outer surface |
| 70 | Connector |
| 72 | Straps |
| 74 | Hand |
| 78 | Finger |
| 82 | Thumb |
| 102 | Electronic device interface |
| 106 | Electronic device |
| 110 | Dock |
| 118 | Finger |
| 122 | Edge |
| 126 | Fitting |
| 154 | Cavity |
| 158 | Hinge |
| 162 | Button |
| 166 | Spring housing |
| 170 | Screw |
| 172 | Rail |
| 176 | Toothed portion |
| 180 | Outer wall |
| 186 | Top portion |
| 190 | Bottom portion |
| 194 | Top latch |
| 198 | Bottom latch |
| 202 | Primary arm |
| 206 | Cavity |
| 210 | Secondary arm |
| 220 | Sliding hinge |
| 224 | Protrusion |
| 228 | Grip |
| 232 | Teeth |
| 236 | Release button |
| 300 | Electronic device interface |
| 304 | Dock |
| 308 | Arm |
| 312 | Finger |
| 314 | Set screw |
| 316 | Top portion |
| 320 | Bottom portion |
| 324 | Cavity |
| 328 | Curled portion |
| 332 | Recess |
| 336 | Interconnection mechanism |
| 340 | Positioning grip |
| 344 | Inner teeth |
| 348 | Outer teeth |
| 352 | Pinion gear |
| 356 | Spring-loaded gear |
| 360 | Limiting gear |
| 364 | Channel |
| 368 | Stop |
| 370 | Ratchet gear |
| 372 | Pawl |
| 376 | Button |
| 380 | Selectively adjustable member |
| 384 | Dock |
| 390 | Locking ring |

It should be understood that the drawings are not necessarily to scale. In certain Instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 1-25, an electronic device interface 2 is provided that selectively interconnects to an electronic device 6. The electronic device interface 2 is generally comprised of a dock portion 10 with selectively adjustable arms 14. The arms 14 end in fingers 18 that engage edges 22 or corners of the electronic device 6, which secures the electronic device interface 2 to the electronic device 6. To view the electronic device, a user can simply hold the interface. Alternatively, the dock portion 10 includes a fitting 26 that selectively mates with a complimentary fitting of a base portion 30 of a positioning grip 34. The positioning grip 34 further includes a stem 38 that is interconnected to a support 42. One of skill in the art will appreciate that although a bayonet type fitting is shown, other types of selective interconnection systems may be employed without departing from the scope of the invention, such as click lock, magnets, suction, or other selectively interconnection mechanisms known in the art. The arms 14 may also be used to hang or otherwise support the portable electronic device 6 from a vertical surface, for example. One skilled in the art will appreciate that any number of arms may be provided.

The support 42, and stem 38, may be made of flexible wire frame that is over-molded with soft, comfortable material, such as silicone. Further, selectively positionable surfaces 46 associated with the support 42 may be deformed to facilitate support of the electronic device 6 and to provide additional interconnection schemes. One skilled in the art will appreciate that the stem 38 and associated support 42 may be selectively interconnected to the base 30 wherein supports of different shapes may be interchangeably interconnected to the base 30 depending on the desires of the user. For example, support that is ideal for use in typing or viewing of the portable electronic device may not be suitable for selectively interconnecting the device to a podium, wheelchair, treadmill, inside surface of the car, or a movable support.

The stem 38 may be rotatably interconnected to the base 30. Alternatively, the base 30 may be rotatably interconnected to the fitting 26 and/or dock 10. For example, it is contemplated that the base 30 may be able to rotate relative to the dock 10 once interconnected, thereby providing the user with an alternate positioning schemes. Furthermore, some embodiments of the present invention include a base/stem interconnection comprised of a ball and socket joint that allows the stem 38 and interconnected support 42 to angulate relative to the electronic device 6. Although a positioning grip 34 is primarily shown and described in this application, one of skill in the art will appreciate that the electronic device interface 2 may selectively interconnect to other members, devices, or apparatus, such as a mount positioned on a table or a wall, a podium, a telescoping member, a tripod, etc.

Referring now specifically to FIGS. 1-3 and 21, one embodiment of the present invention is shown. Here, the electronic device interface 2 includes a dock 10, which may be shaped somewhat like a puck. The dock includes a fitting 26 that is positioned in a recessed portion 50 of the dock 10 that is adapted to receive the base 30 of the positioning grip 34. The arms 14 are comprised of telescoping members. In some embodiments of the present invention, the arms 14 may be completely concealed within a cavity 54 provided by the dock 10 when not in use.

In operation, the interface 2 is positioned against a back surface 58 of the electronic device 6. Next, the arms 14 are deployed and the fingers 18 are engaged onto the outer edges 22 or corners of the electronic device 6. The fingers 18 may be made entirely or at least partially of an elastomeric material, such as rubber, that enhances the engagement between the fingers 18 and the electronic device. It is contemplated that the arms 14 be biased inwardly wherein they retract into the dock after the fingers 18 are released from the edge, somewhat similar to the mechanism that causes a tape of a tape measure to retract when released. It follows that after the fingers 18 are engaged onto the edge 22 of the electronic device 6, the arms 14 will retract in the same manner, thereby compressing the electronic device 6 between the fingers which secures the interface 2 to the electronic device 6. The contemplated arm tension may be generated by rotating a knob associated with the dock, or rotating another portion of the dock 10, to "wind" the arms into the dock. Other embodiments of the present invention are comprised of at least two deployable resilient bands that function with mechanisms similar to those found on tape measures that interconnect with the edges 22 or corners of the electronic device 6 (see FIG. 25). Furthermore, those of skill in the art will appreciate that although two arms are provided, any number of arms may be employed by the electronic device interface 2 without departing from the scope of the invention.

After the interface is securely engaged onto the electronic device, the positioning grip 34 may be interconnected. In the embodiment shown, the positioning grip 34 is placed upon the fitting 26, which may comprise a bayonet fitting, rotated, and locked in place. Again, other interconnection schemes may be employed.

FIGS. 4-6 show an alternative embodiment of the present invention wherein the arms 14 are offset relative to each other so that they retract more easily into the dock 10. Further, the fingers 18 associated with this embodiment of the present invention are able to rotate along a longitudinal axis 62 thereof.

Referring now to FIGS. 7-12, yet another embodiment of the present invention is shown that employs arms 14 that are of a different configuration than those shown above. Here, the arms 14 include elongated connection points for association with the dock 10. As a result, the fingers 18 are longer and provide increased engagement with an edge of the electronic device.

Figure 15:
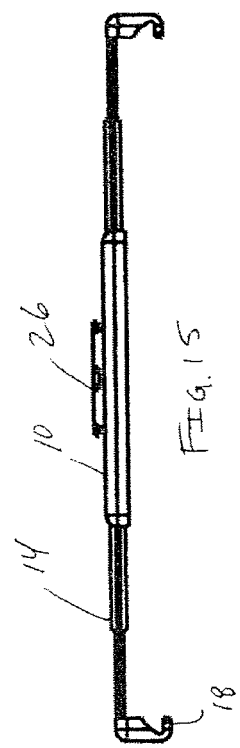
FIG. 15 is a front elevation view of FIG. 14.
Figure 14:
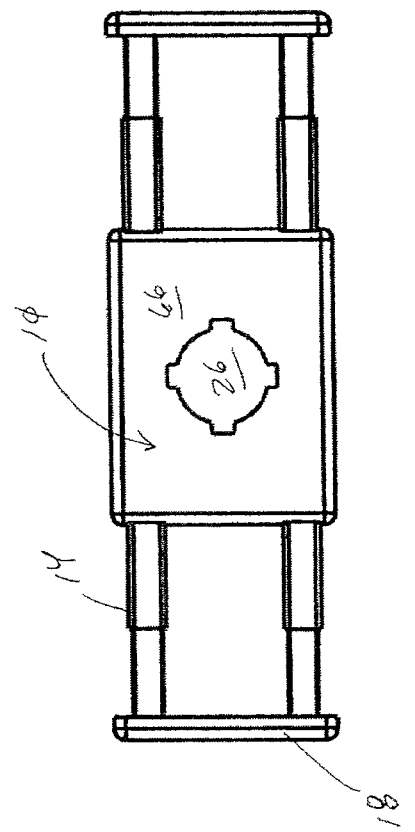
FIG. 14 is a top plan view of the electronic device interface shown in FIG. 13.
Figure 13:
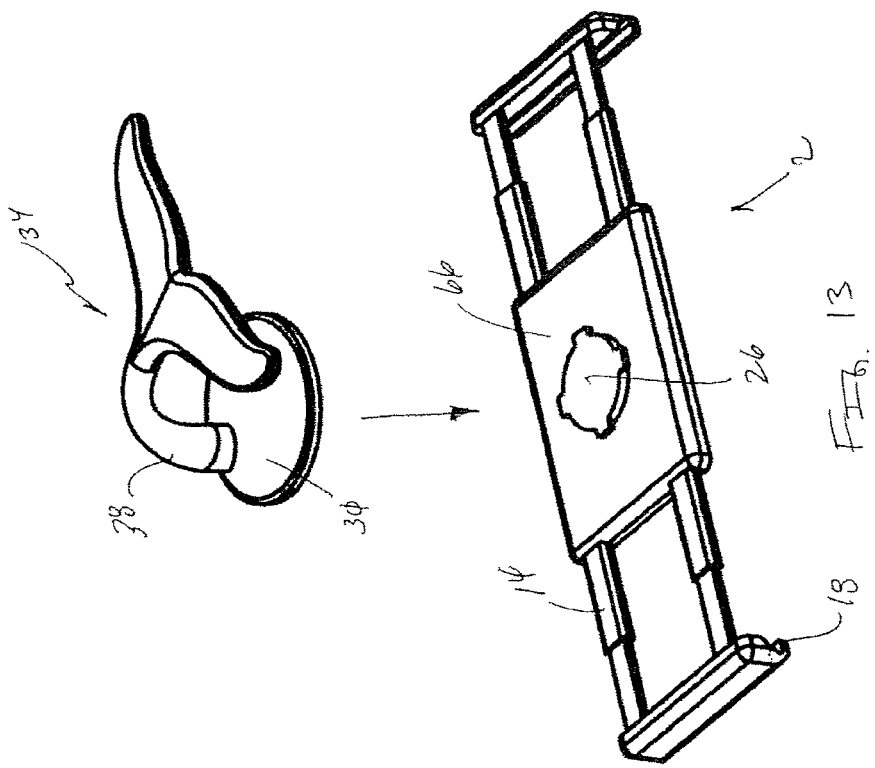
FIG. 13 is an exploded perspective view of the electronic device interface and associated positioning grip of another embodiment of the present invention.
Figure 16:
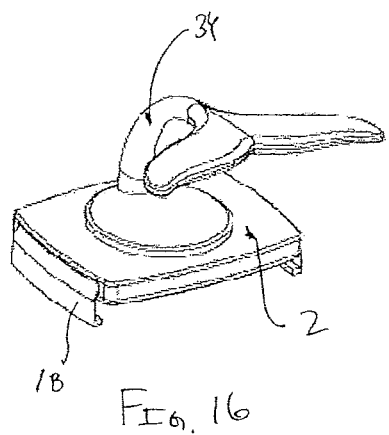
FIG. 16 is a perspective view of the electronic device interface and associated positioning grip of another embodiment of the present invention.
Figure 18:
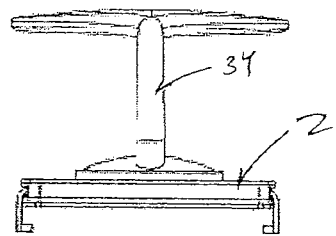
FIG. 18 is a front elevation view of FIG. 16.
Figure 17:
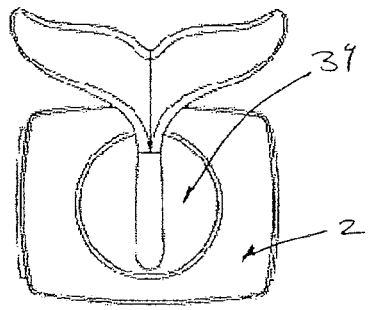
FIG. 17 is a top plan view of FIG. 16.
Figure 20:
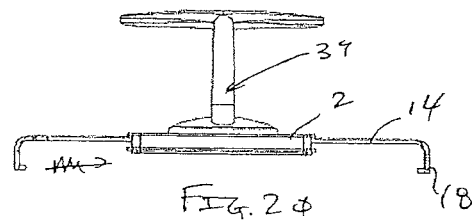
FIG. 20 is a front elevation view of FIG. 19.

FIGS. 13-15 show an embodiment having telescoping arms 14. Furthermore, the fitting 26 portion of this embodiment is extended away from the outer surface 66 of the dock 10. In this instance, the base 30 would have a recess (not shown) for receiving the fitting 26. This embodiment illustrates that other interconnection schemes may be employed without departing from the scope of the invention.

Figure 21:
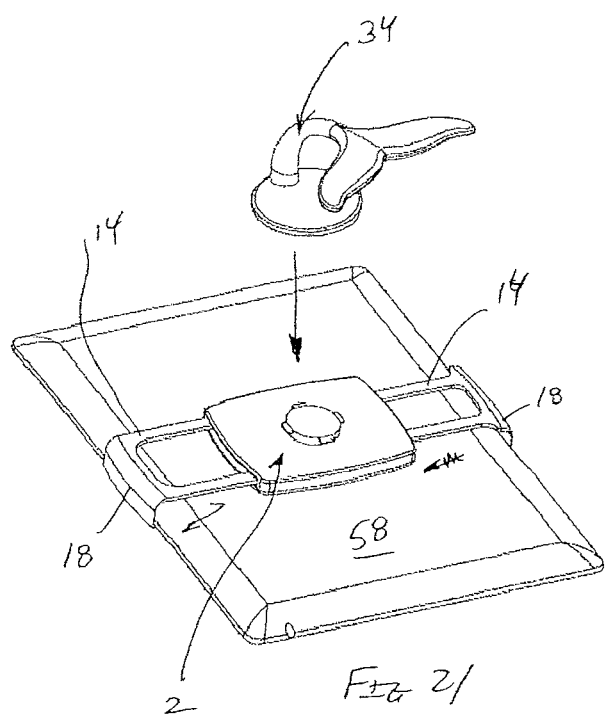
FIG. 21 is a perspective view showing the electronic device interface of FIG. 16 interconnected to an electronic device.
Figure 19:
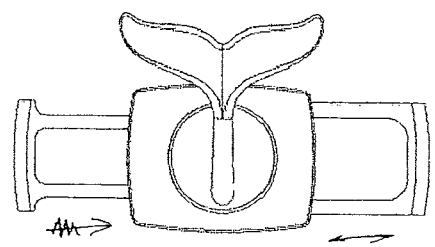
FIG. 19 is a top elevation view of FIG. 16 wherein arms have been extended.

FIGS. 16-21 show an embodiment of the present invention that is similar to those described above where elongated fingers 18 are provided. In operation, the positioning grip 34 is interconnected to the dock 10 of the electronic device interface 2. One of skill in the art will appreciate that the interconnection between the grip 34 and the interface 2 may be achieved after the interface is interconnected to the electronic device. Next, the arms 14 are deployed and the fingers 18 are engaged onto the outer edge 22 of the electronic device 6 wherein the interface 2 contacts the rear surface 58 of the electronic device. One of the arms is not biased and manually slides in and out of the dock 6. The other arm is biased, which is apt to automatically recoil into the cavity provided by the interface 2. In FIG. 21, for example, the arm on the right is the biased arm that applies the compressive load described above that is connected by the non-biased arm. Again, the tension applied to the electronic device 6 may be selectively altered by twisting a portion of the interface 2, for example.

FIGS. 22-24 show another embodiment of the present invention. Here, the arms 14 are fixed relative to the dock 10. The fitting 26 is similar to that shown above with respect to FIGS. 1-3 and the base 30 is received within a recess 50 associated with the dock. Another difference of this embodiment of the present invention is that instead of fingers, a connector 70 is associated with the ends of the arms 14.

Figure 25:
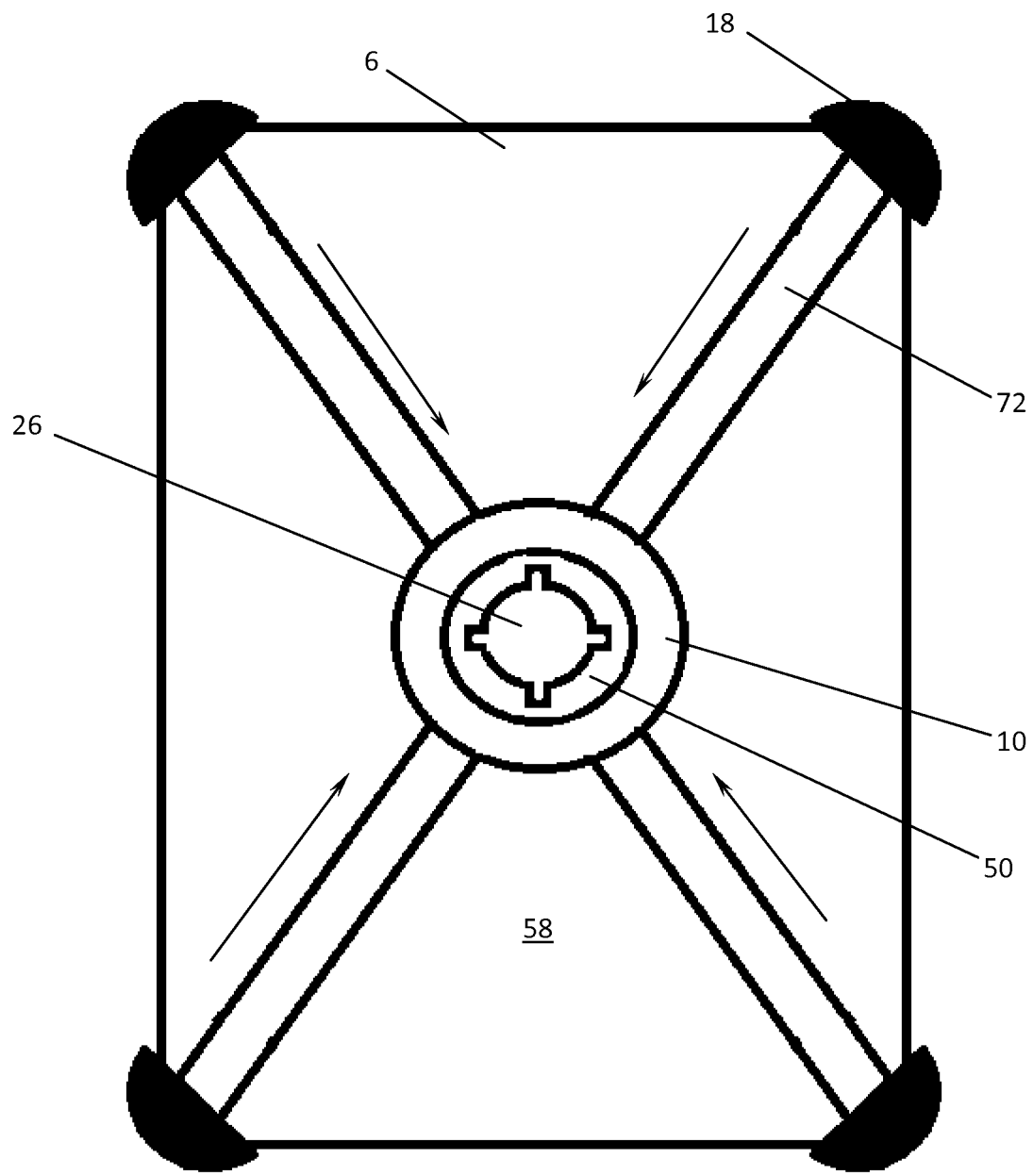
FIG. 25 is a rear elevation view of an interface of another embodiment of the present invention.
Figure 26A:
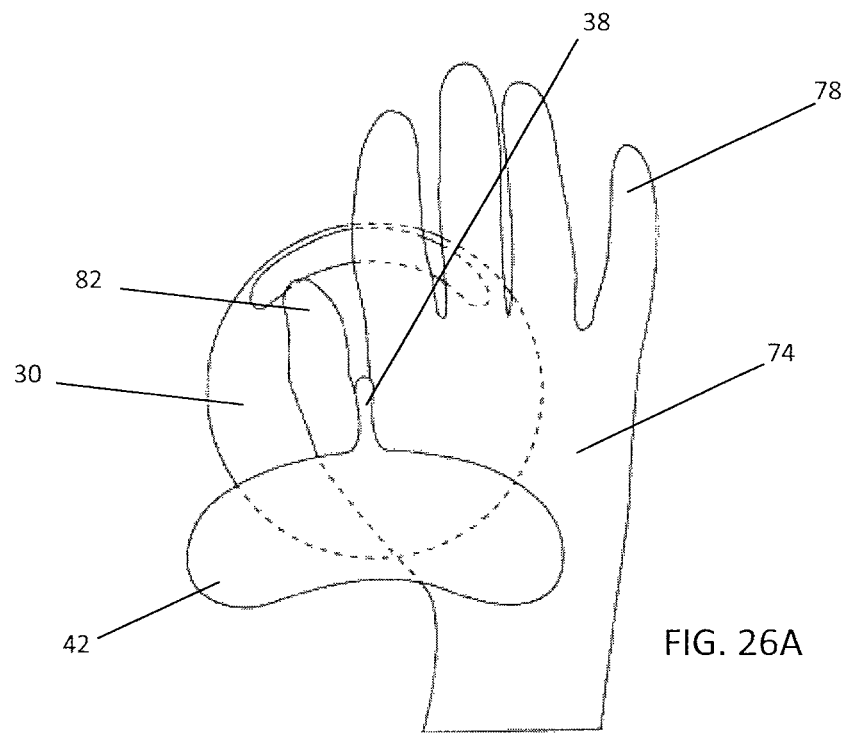
FIG. 26A is a top plan view showing the user's hand engaged onto the positioning grip.
Figure 26B:
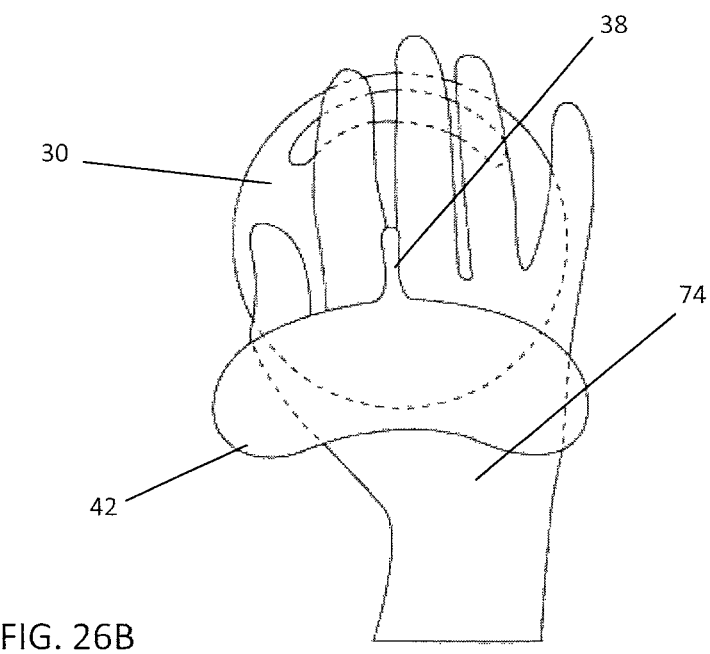
FIG. 26B is a top plan view showing the user's hand engaged onto the positioning grip.
Figure 26C:
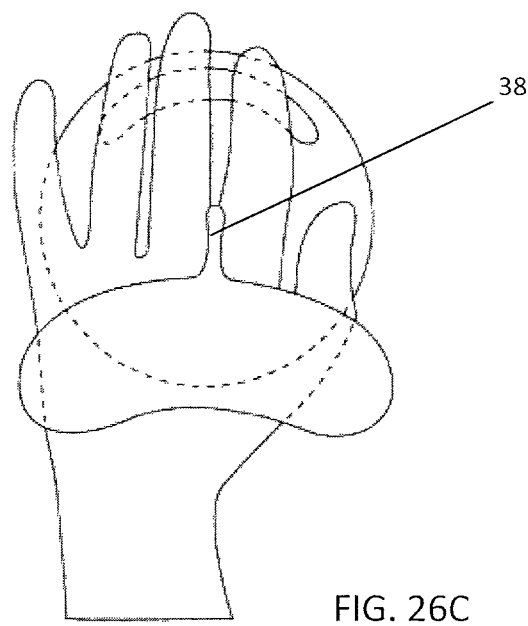
FIG. 26C is a top plan view showing the user's hand engaged onto the positioning grip.
Figure 26D:
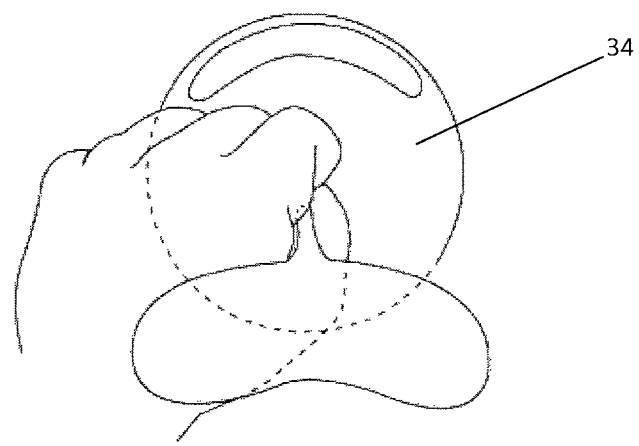
FIG. 26D is a top plan view showing the user's hand engaged onto the positioning grip.
Figure 27:
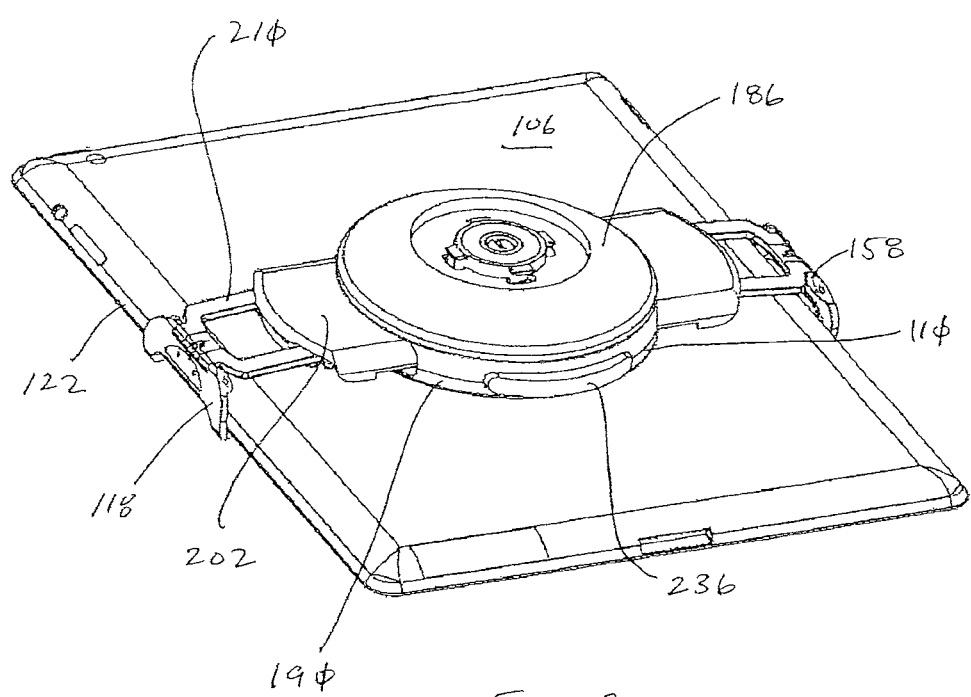
FIG. 27 is a perspective view of an electronic device interface of another embodiment interconnected to an electronic device.
Figure 28:
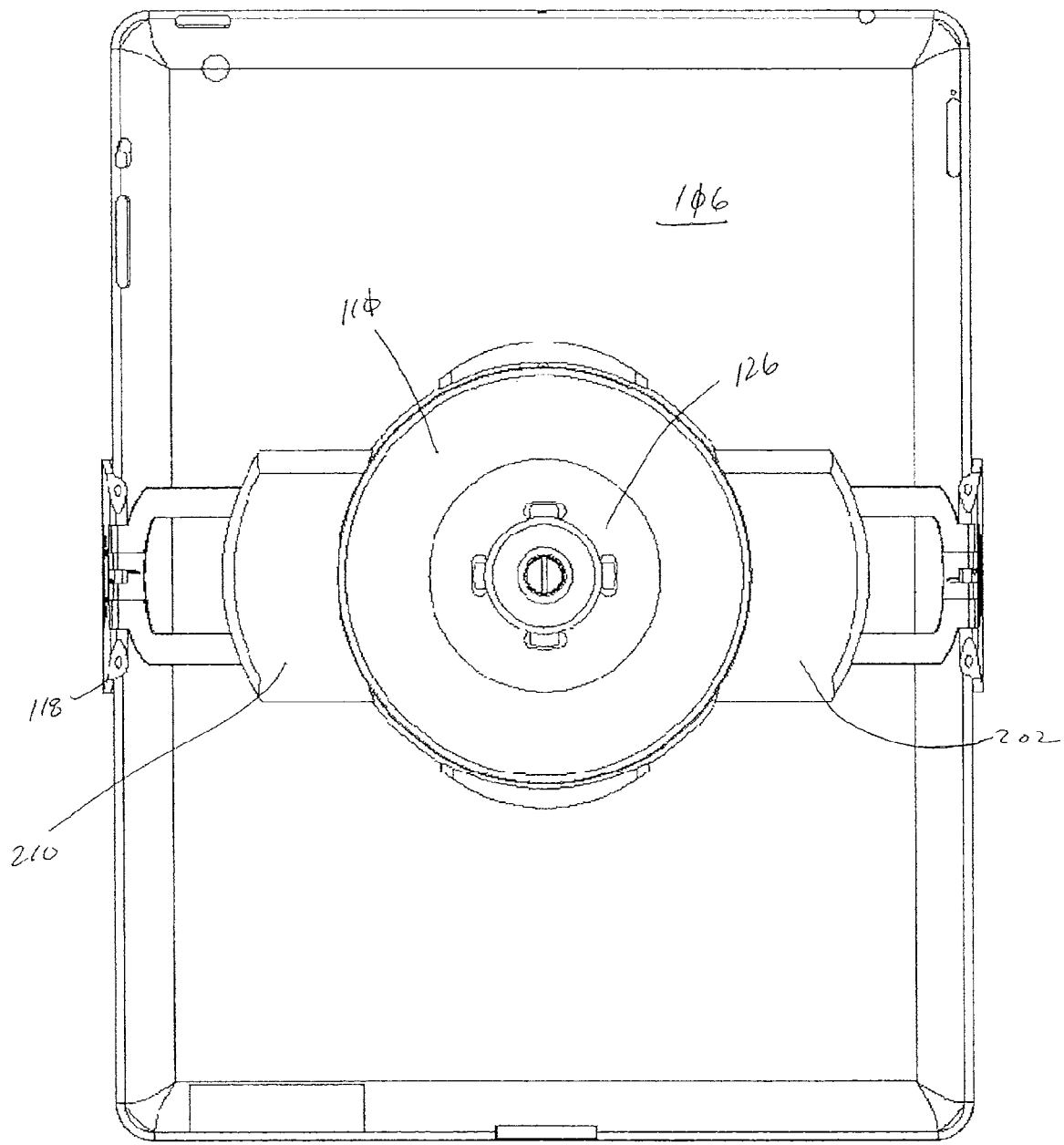
FIG. 28 is a top plan view of FIG. 27.
Figure 29:
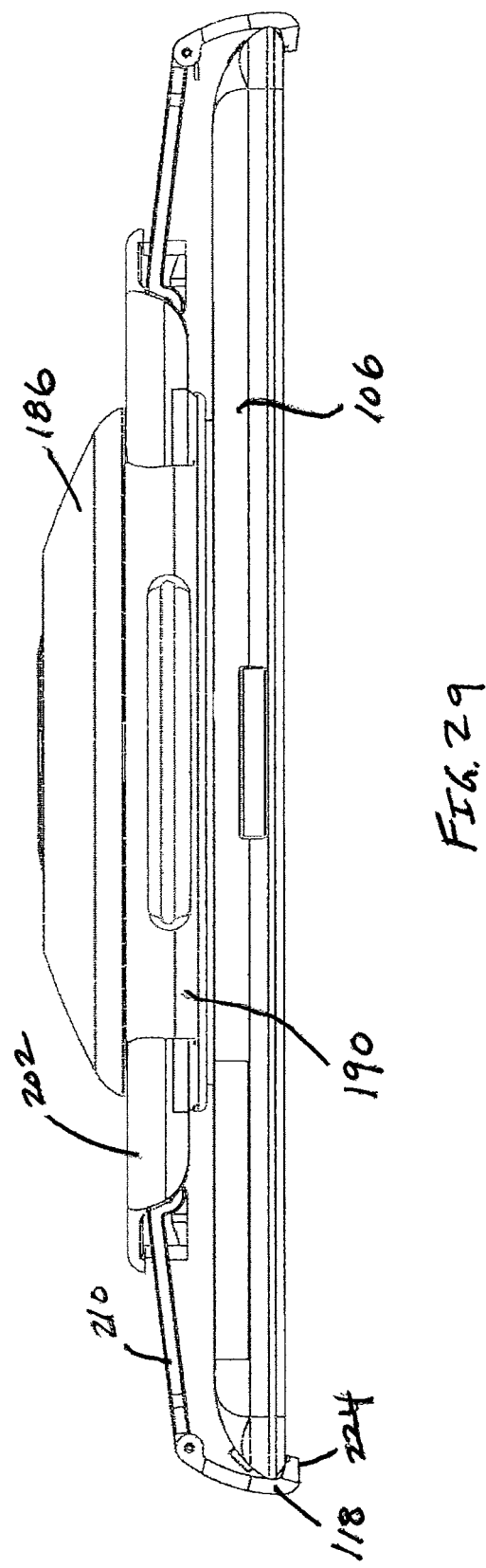
FIG. 29 is a front elevation view of FIG. 27.

FIG. 25 shows another embodiment of the present invention that employs four straps 72 operably interconnected to the dock 10. The straps 72 end in fingers 18, or other interconnection devices that engage the corners or edges of the electronic device 6. The straps 72 recoil into the dock 10 when not in use. Again, the compressive force provided by the straps 72 and associated fingers secure the interface to the electronic device 6.

FIG. 26 illustrates the ways a user's hand 74 can engage with the stem 38 and/or a base 30. Here, it is illustrated that the user can place the stem 38 between fingers 78 or the fingers and a thumb 82.

Referring now to FIGS. 27-42 another embodiment of the electronic device interface 102 is shown that employs a two-part dock 110 having a top portion 186 that moves relative to, and selectively locks to, a bottom portion 190. The top portion 186 is spring-biased with respect to the bottom portion 190 and is selectively locked relative thereto by the interconnection of a top latch 194 to a bottom latch 198. The top portion of the dock 186 includes a fitting 126 for receiving a positioning grip similar to the embodiments described above. The bottom portion 190 rests against the electronic device 106. A cavity 154 is provided between the top portion 186 and the bottom portion 190 that selectively receives primary arms 202. The primary arms 202 also include a cavity 206 for receipt of secondary arms 210. The secondary arms 210 terminate in fingers 118 that engage an outer edge of the electronic device. The secondary arms 210 may be designed to rotate relative to the primary arms 202. More specifically, in one embodiment, the secondary arms are free to travel about 30 degrees from parallel. The secondary arms terminate in fingers 118 that rotate on hinges 158 outwardly to receive the outer edge of the electronic device 106.

Figure 30:
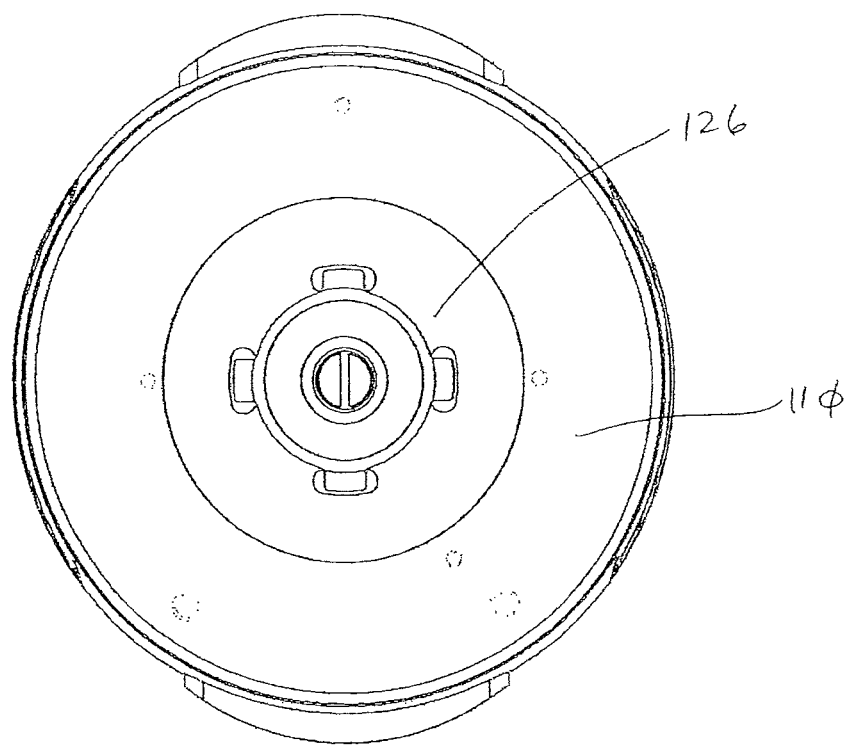
FIG. 30 is a top plan view of the electronic device interface of FIG. 27 in a collapsed state.
Figure 31:
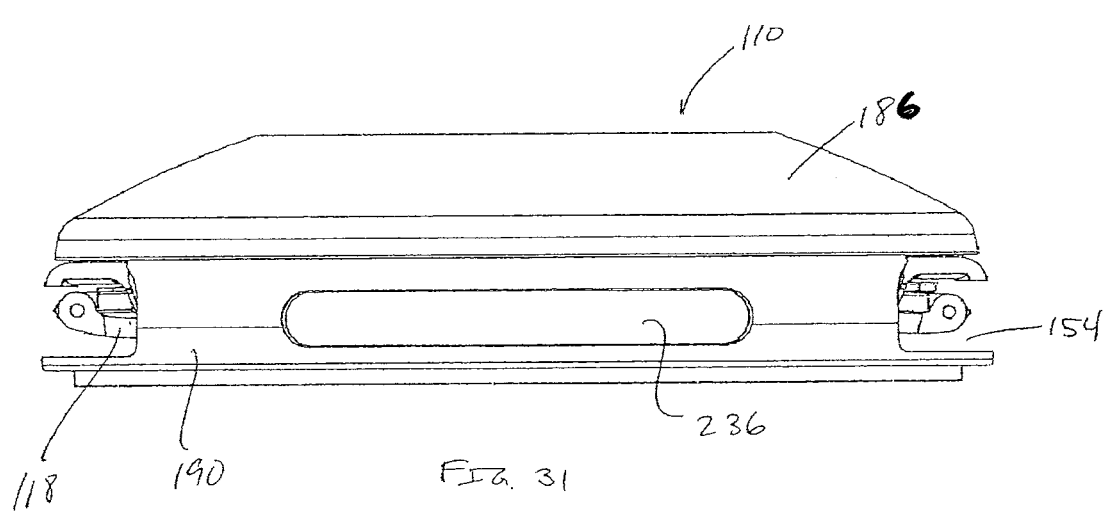
FIG. 31 is a side elevation view of FIG. 30.
Figure 32:
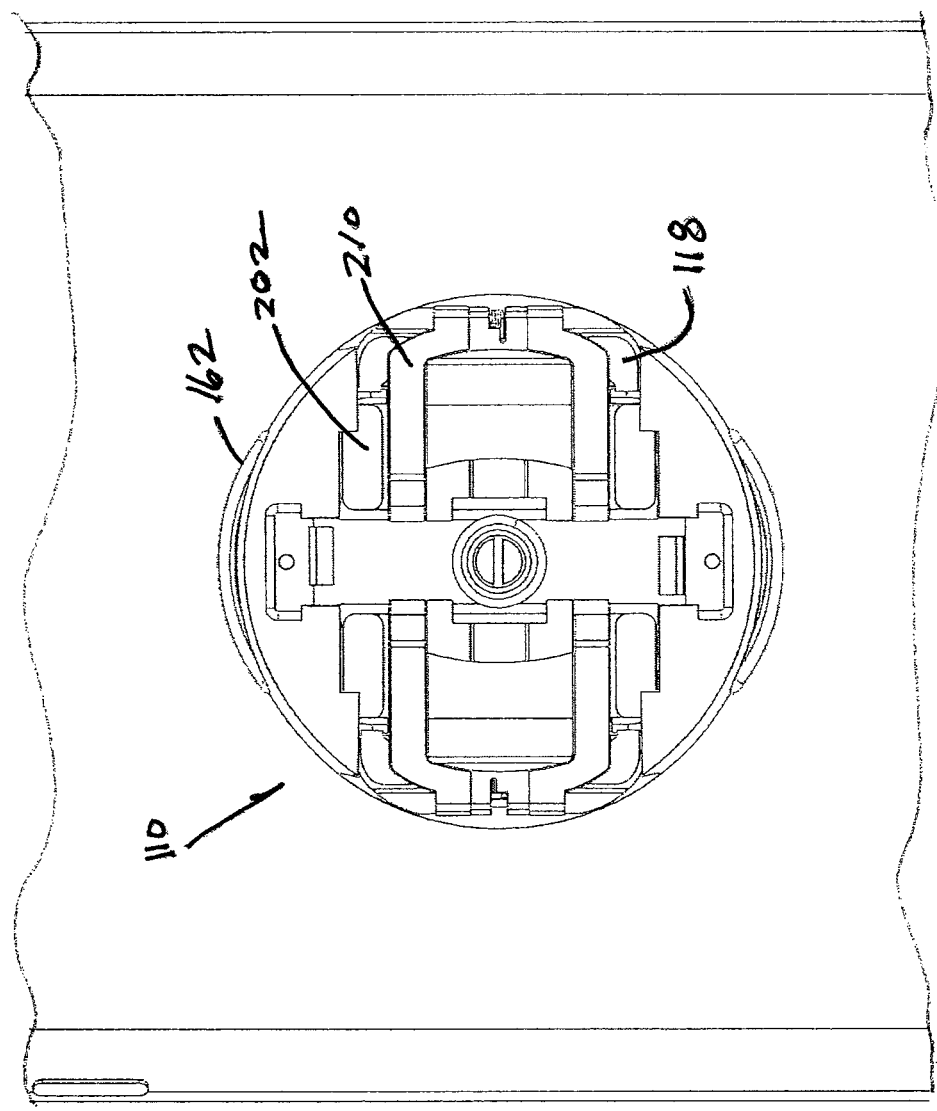
FIG. 32 is a top plan view of the electronic device interface similar to that of FIG. 27 wherein a top portion of the dock has been removed.

FIGS. 30-32 shows the electronic device interface 102 in a collapsed state, wherein the primary arms 202 and secondary arms 210 are positioned completely within an outer envelope of the dock 110. The telescoping arms contemplated by embodiments of the present invention may expand to reach over twice the diameter of the dock 110, about 2.1:1 ratio of expanded to collapsed width, to engage the outer edges of the electronic device 106. In one embodiment of the present invention, the height of the dock 110 is about 20-24 mm and the diameter is 92 mm. To access the arms, a user initially presses at least one button associated with the dock 110 that exposes the primary 140 and secondary arms 210. The primary arms account for up to 70 mm of expansion of the arms.

Figure 33:
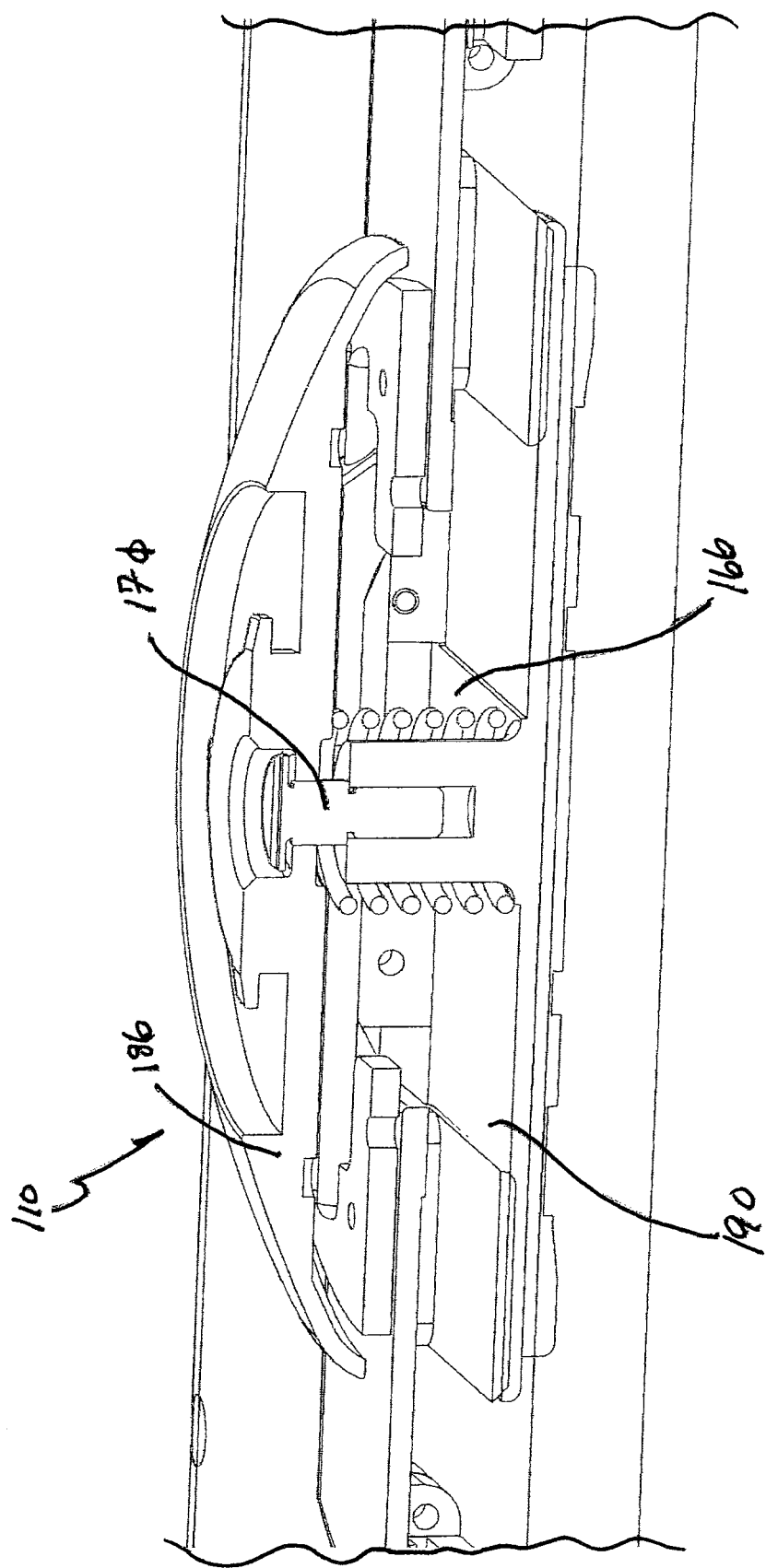
FIG. 33 is a perspective cross section of the dock of the embodiment shown in FIG. 27 in a first, open position.
Figure 34:
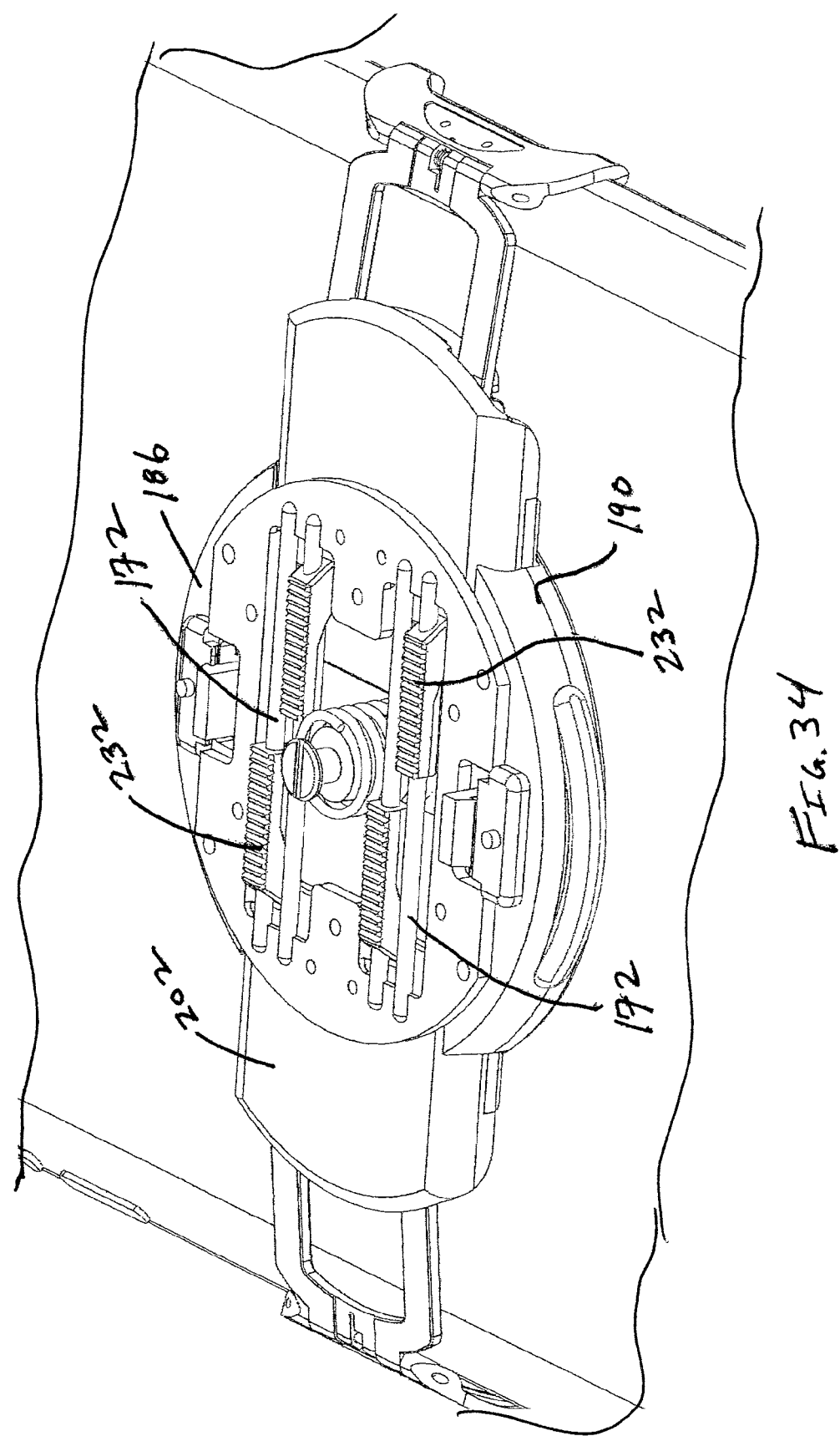
FIG. 34 has a perspective view of the dock wherein primary arms are deployed.
Figure 35:
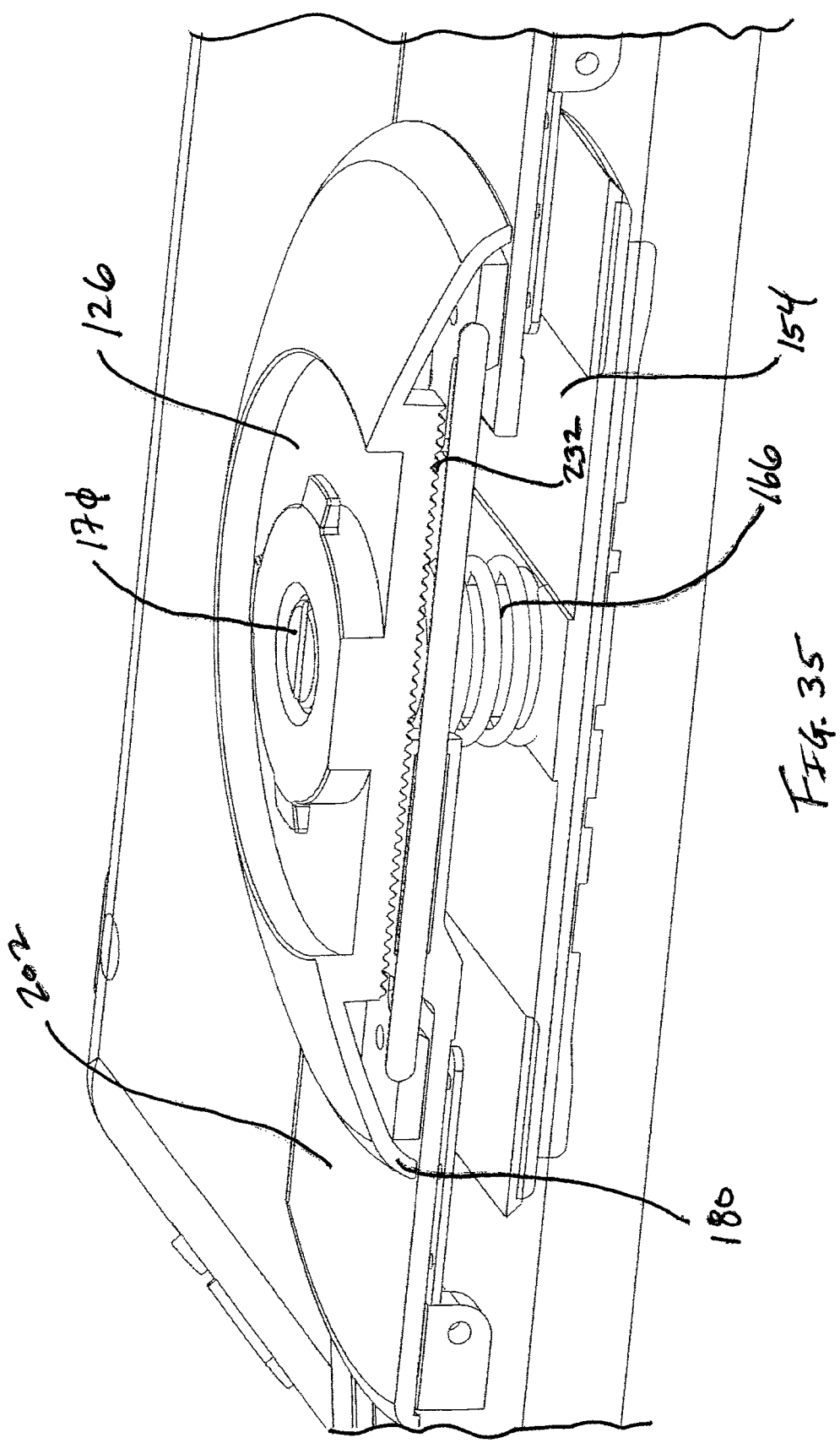
FIG. 35 is a perspective cross section of FIG. 34 wherein a top portion of the dock is in a second, closed position of use wherein the primary arms are locked relative to the dock.

Deployment of the primary arms 202 is shown in FIGS. 33-35. More specifically, FIG. 33 shows the top portion 186 of the dock 110 in a first, open position of use wherein the top portion 186 is located away from the bottom portion 190 of the dock 110. The top portion 186 of the dock 110 is spring-loaded away from the bottom portion 190 by a spring that is located in a spring housing 166. A screw 170 may be used to alter the spring tension. When the top portion is in this first position of use, an enlarged opening is provided between the top portion 186 and the bottom portion 190 that allow the primary arms 202 to deploy. The primary arms 201 include rails 172 that are received within toothed portions 176 (see FIG. 40). The top portion 186 of the dock 110 has an outer wall 180 that prevents the primary arms 202 from being completely removed from the dock 110. When fully deployed the respective toothed portions 176 of the primary arms 202 are separated from each other. When in a collapsed state, the toothed portions 176 are positioned generally adjacent to each other. The rails act as guides that provide and maintain a significant bearing surface when the primary arms are fully extended. Further, the primary arms account for up to 70 mm of arm expansion.

Figure 37:
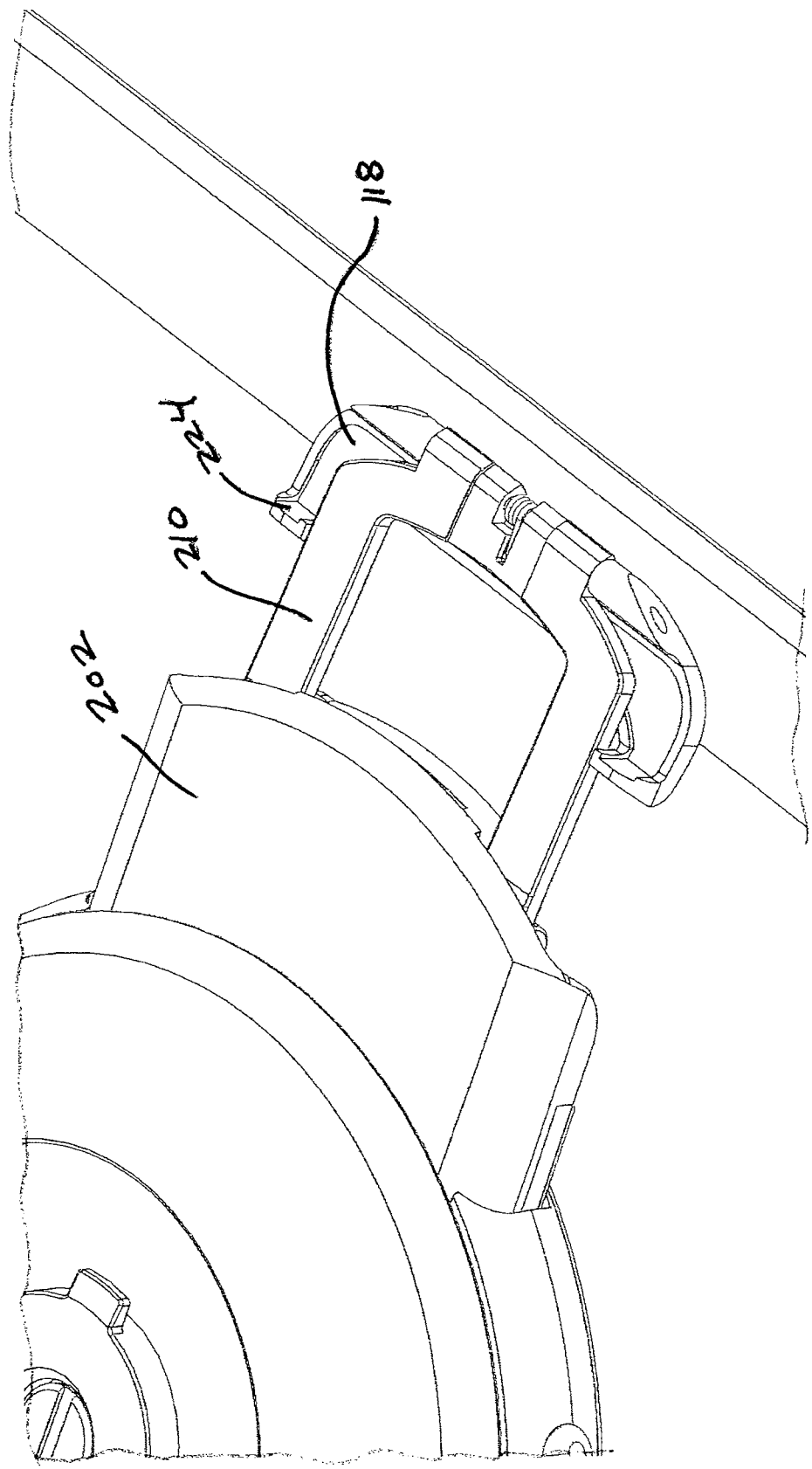
FIG. 37 is a detailed view of a deployed primary arm and a partially deployed secondary arm.
Figure 38:
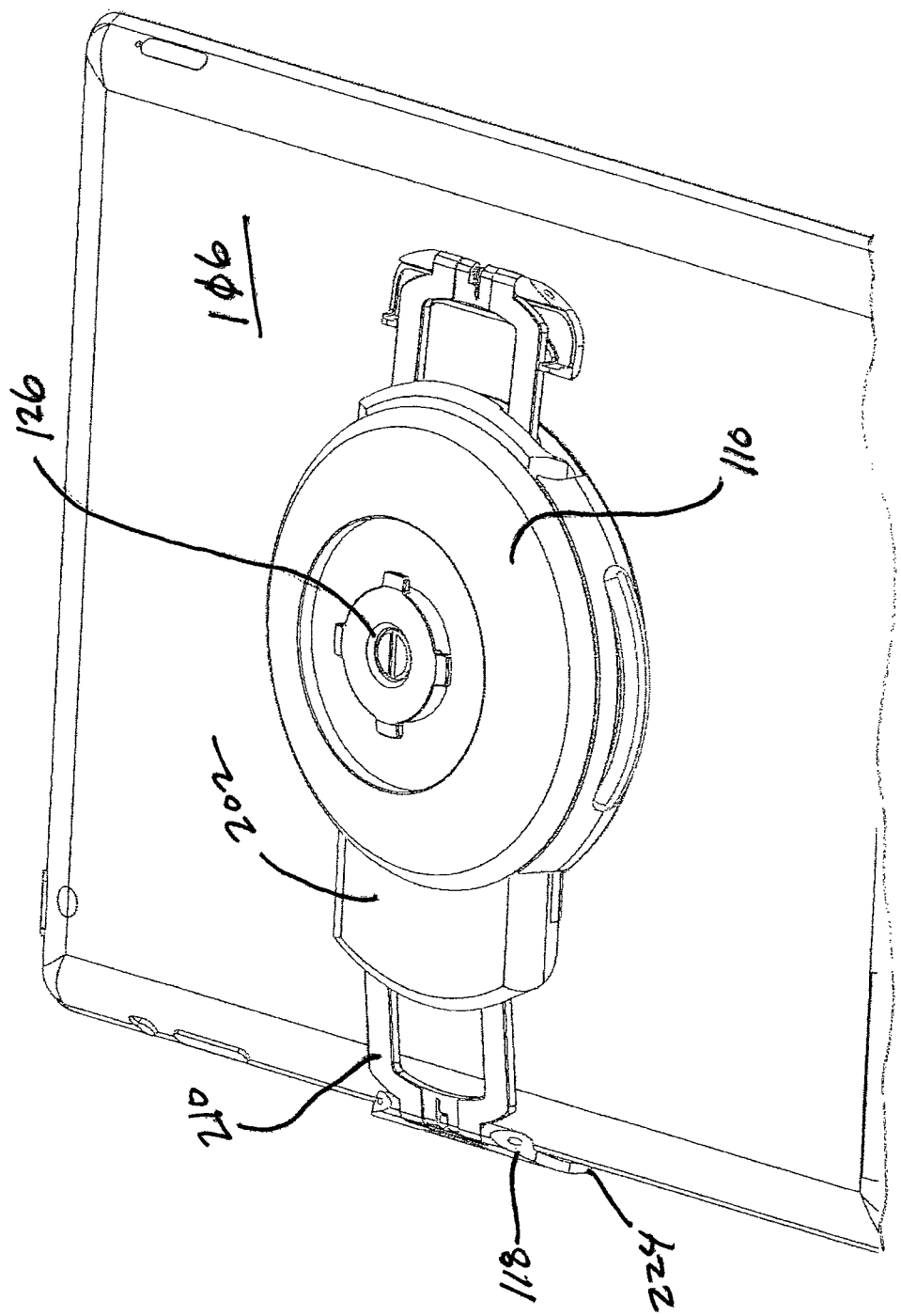
FIG. 38 is a top perspective view showing one of the primary and secondary arms fully deployed and associated with an edge of the electronic device.
Figure 39:
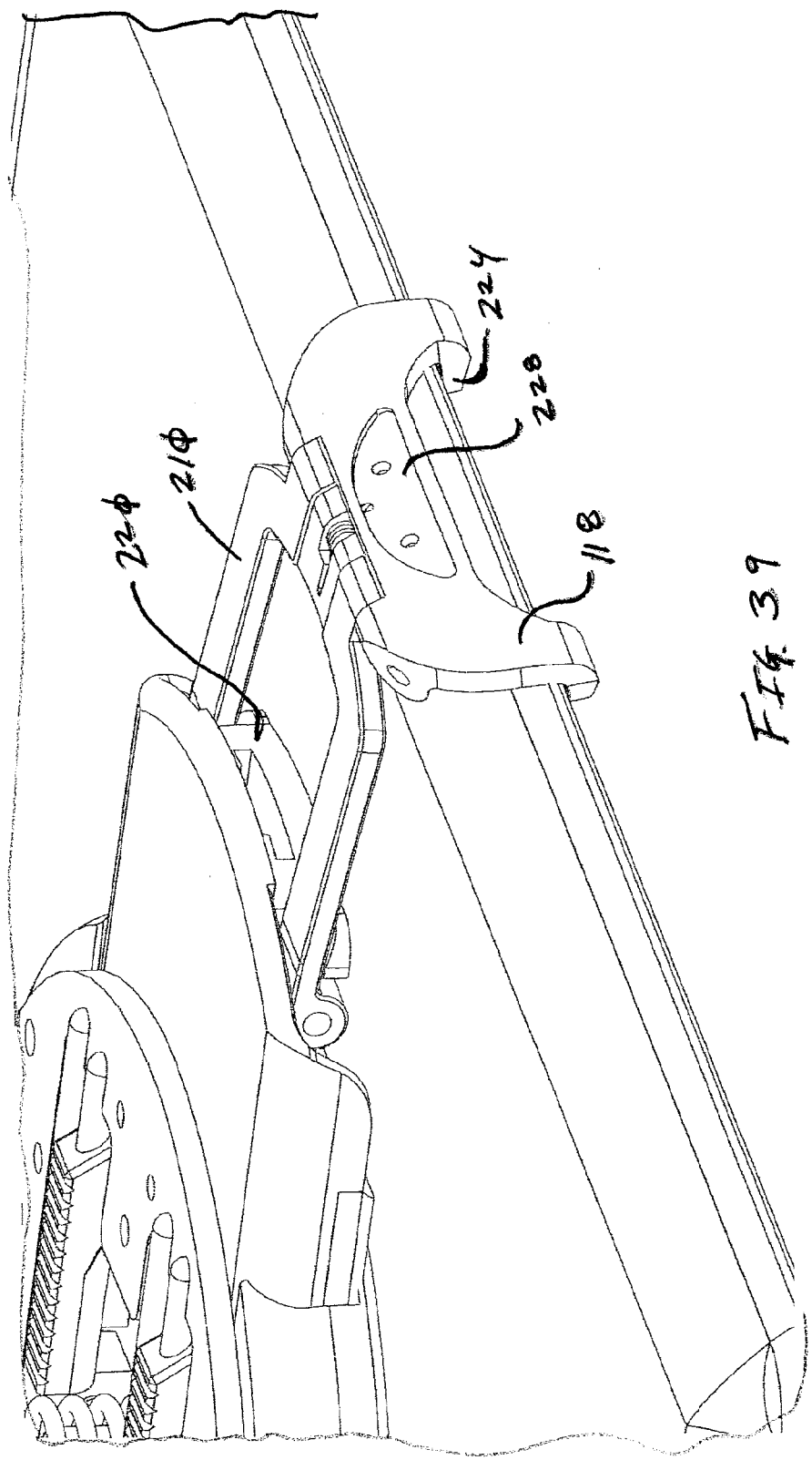
FIG. 39 is a detail view showing the fingers of the secondary arm associated with the edge of an electrical device.

Referring now to FIGS. 37-39, the secondary arms are interconnected to sliding hinges 220 that are accommodated within the primary arms 202. The sliding hinges 220 have two orientations: 1) imbedded within the primary arms and 2) fully extended. When fully extended, the secondary arms are maintained by a spring plunger and detent. The secondary arms are also able to rotate with respect to the primary arms 202 and allow an enhanced engagement between the fingers 118 and the edge of the electronic device 106.

The fingers 118 may include protrusions 224 for engagement with the outer surface of the electronic device as shown in FIG. 38. Further, the fingers 118 include a grip 228 for engagement onto an edge of the electronic device. The grips may be constructed of pads made of a compressible material such as rubber. The fingers are also hingedly interconnected to the secondary arms and are biased by torsion springs. When the fingers are not engaged onto the electronic device, they automatically retract which allows the secondary arms to be collapsed within the primary arms. In one embodiment the grip is about 50 mm wide.

Once the fingers 118 are located on the edges of the electronic device, the top portion 186 of the dock 110 is deflected towards the bottom portion 190 which forces the top latch 194 into engagement with the spring-loaded bottom latch 198 to lock bottom the top portion 186 of the dock 110 relative to the bottom portion 190.

Figure 36:
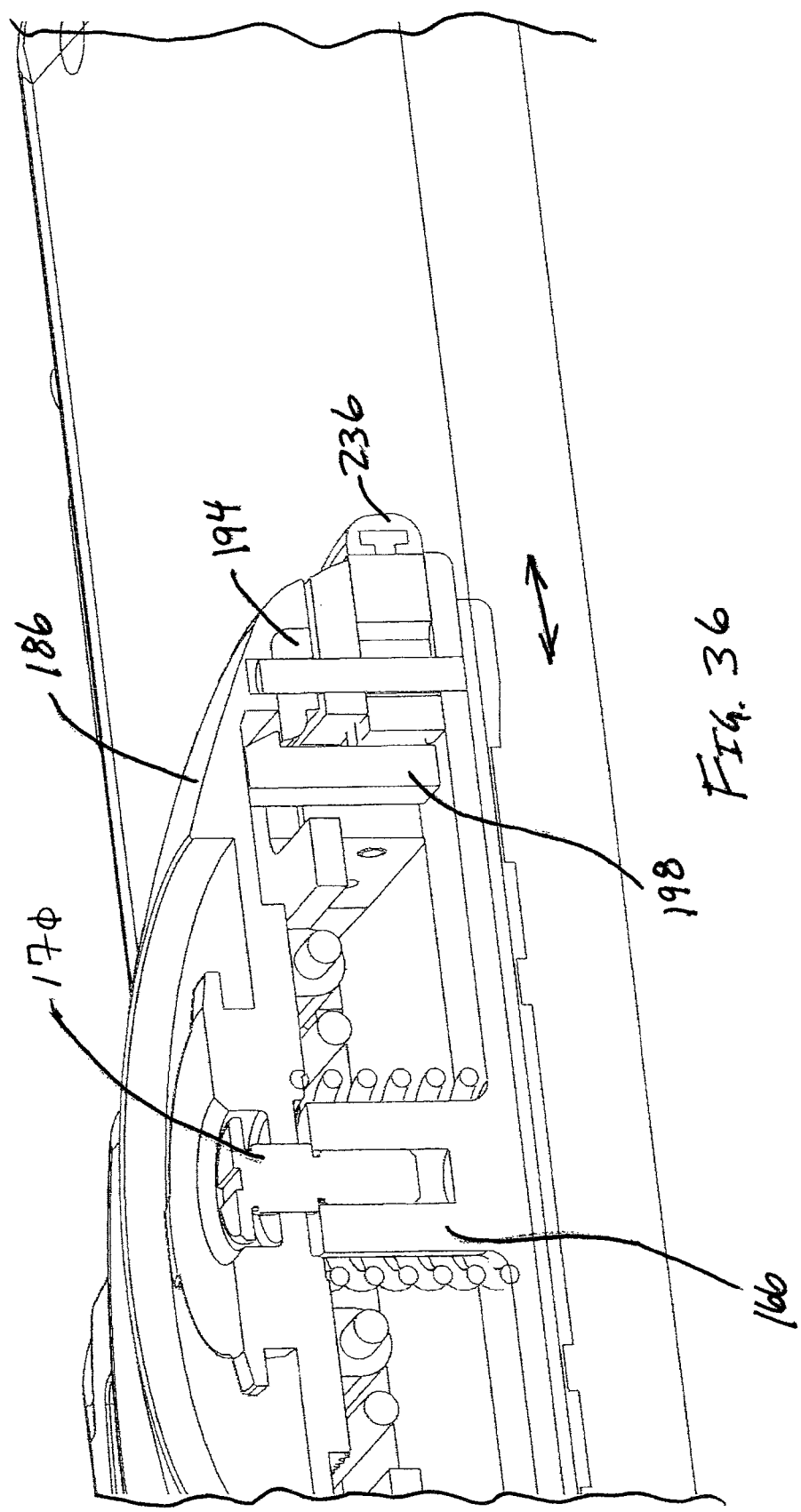
FIG. 36 is a perspective cross sectional view showing the top portion of the dock is in a second locked position of use.
Figure 40:
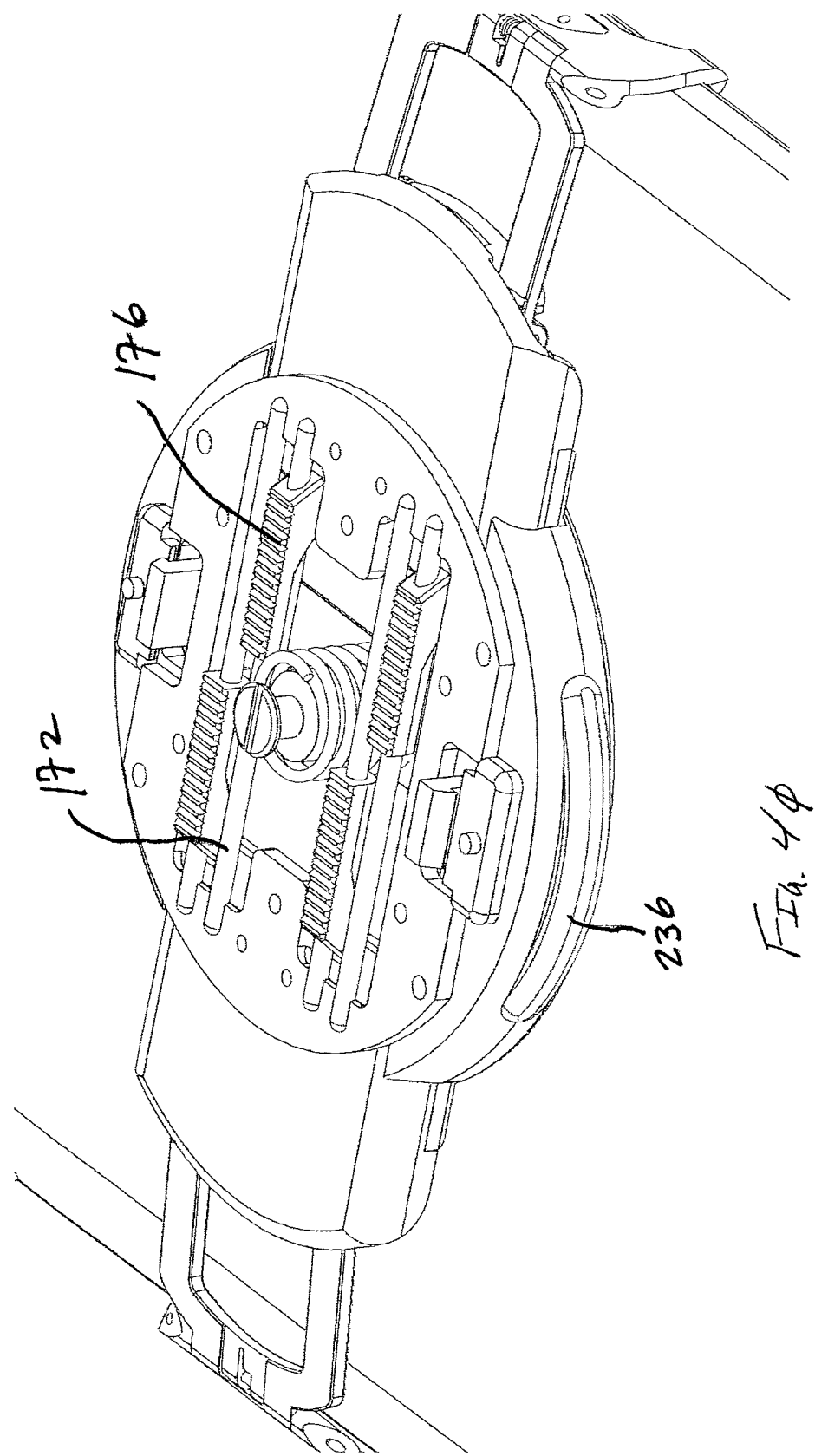
FIG. 40 is a top perspective view showing the release button.

As shown in FIG. 35, when the top portion 186 is brought downwardly, teeth 232 thereon interface with the toothed portions 176 of the primary arms 202. More specifically, a set of teeth of the primary arms engage with a complimentary set of teeth on the top portion 186 to prevent lateral movement of the sliding arms. FIGS. 36 and 40 show a release button 236 that moves the bottom latch 198 inwardly, which separates the bottom latch 198 from the top latch and allows the top portion 186 to move away from the bottom portion. Further, as the top portion 186 moves away from the bottom portion 190, the teeth 232 of the top portion 186 disengage from the toothed portions 176 of the primary arms 202 which allows the primary arms 202 to be collapsed within the dock 110. In operation, after the top portion of the dock is released, the primary arms 202 are initially further expanded to allow the fingers 118 to be removed from the edge of the electronic device. Once the fingers 118 are removed, they are collapse into the secondary arms 210 which are stored within the primary arms 202. The primary arms 202 are then collapsed within the dock 110 for storage.

Figure 41:
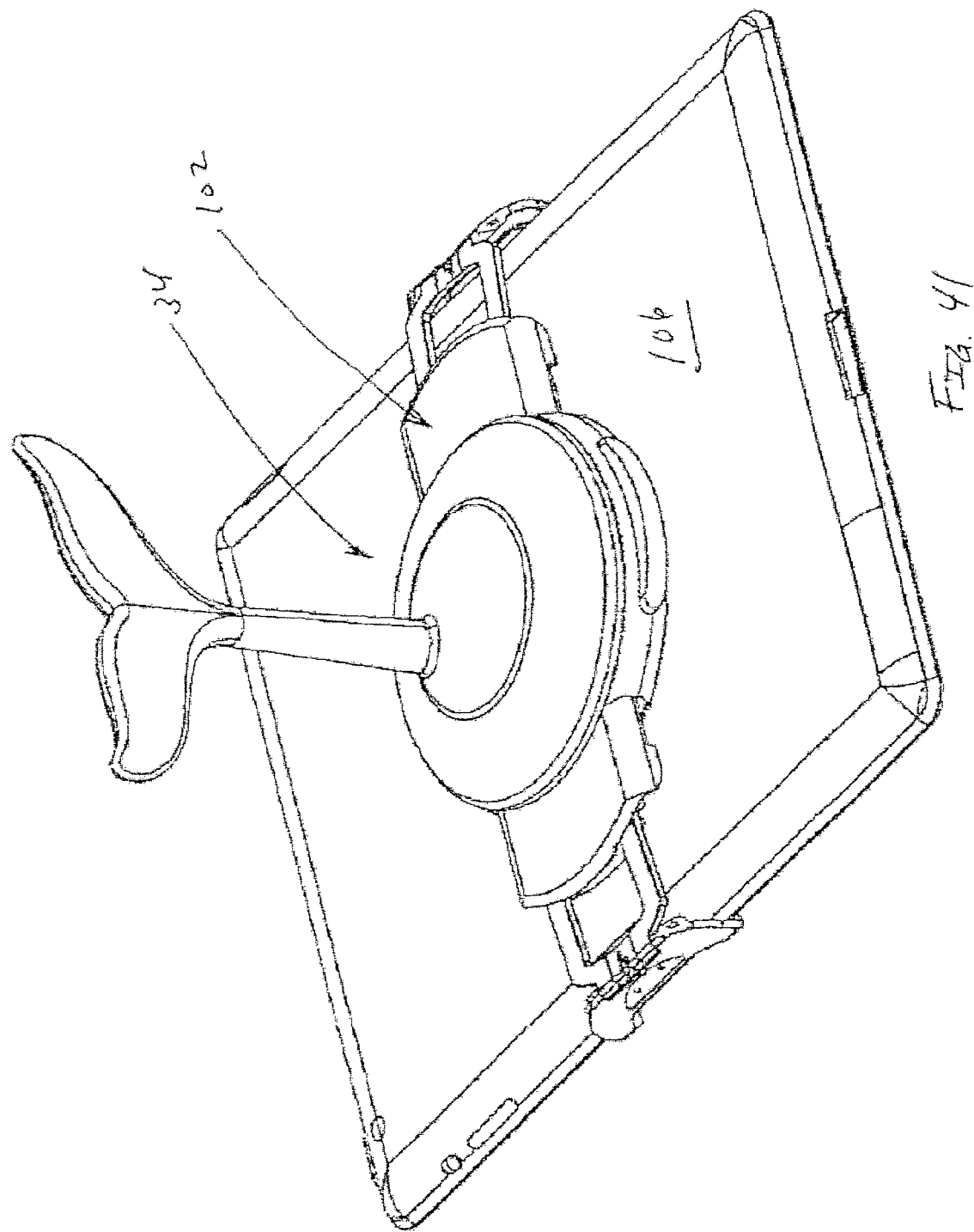
FIG. 41 is a perspective view showing a grip interconnected to the dock.
Figure 42:
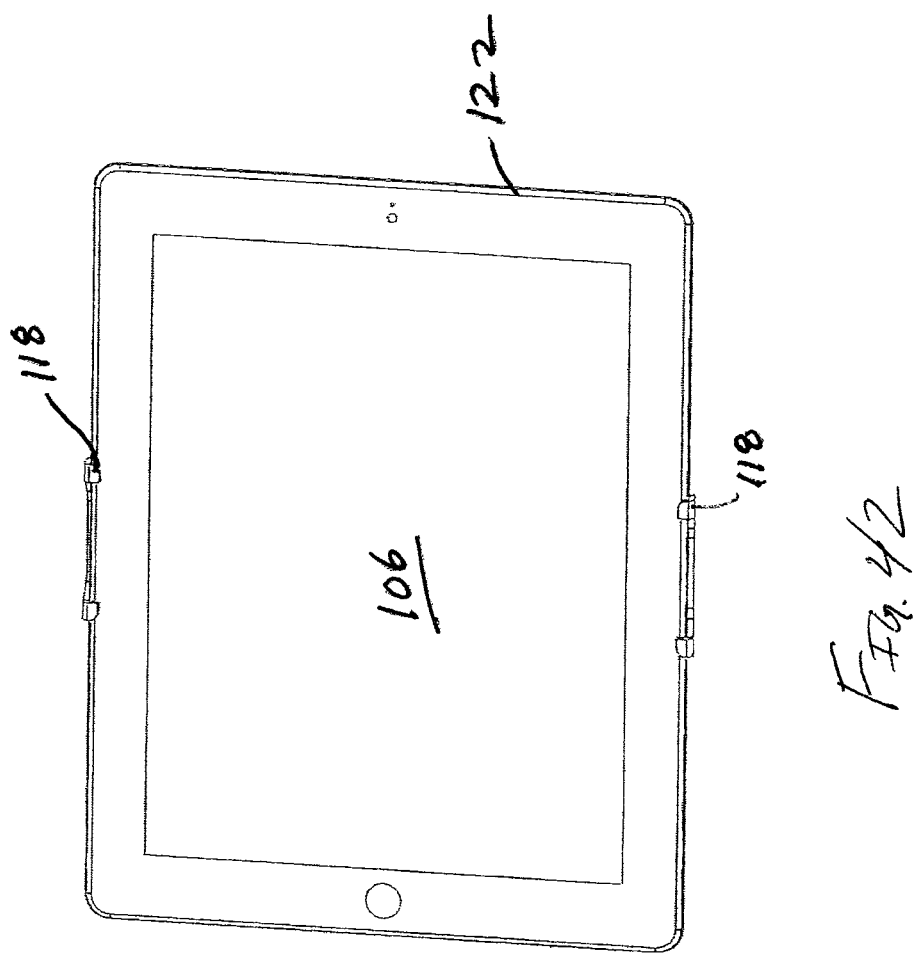
FIG. 42 is a perspective showing the fingers of the embodiment of the present invention engaged onto the edge of the electronic device.

FIGS. 41 and 42 show the interconnected electronic device 106 and interface 102. The interface 102 of this embodiment is approximately 3 inches in diameter and is designed to hold mobile devices weighing up to about 2.5 pounds, which is the approximate weight of an iPad® in a protective case. The interface is also designed to hold electronic devices ranging in width or height from about 5.8 inches to 8.75 inches. Thus, the interface can hold devices having a width or height that is between approximately 2-3 times its collapsed size.

Referring now to FIGS. 43-52, yet another embodiment of the present invention is shown. Here, the electronic device interface 300 is comprised of a dock 304 that selectively receives a plurality of arms 308. The arms 308 are also interconnected to fingers 312 that rotate relative thereto. As in other embodiments described above, the dock 304 includes a top portion 316 that is spaced from a bottom portion 320 to provide a cavity 324 that selectively receives and conceals at least a portion of the arms 308 when they are in a first position of use (see FIG. 50). In a second position of use, the fingers 312 are rotated outwardly from the arms 308. The fingers 312 terminate in a curled portion 328 that interface with the edge of an electronic device 6. The bottom portion 320, fingers 312, and/or curled portion 328, may be made of a soft, compliant material to prevent damage to the electronic device 6 and to enhance gripping of the fingers 312. The electronic device interface 300 may also include a set screw 314 (see FIG. 43) that, when tightened, locks the position of the arms 308 and prevents removal of the fingers 312 from the electronic device. Locking the arms prevents theft of the electronic device when it is used in a public area, such as a restaurant, as a point of service customer interface or kiosk, for example.

The top portion 316 of the dock 304 also includes a recess 332 having an interconnection mechanism 336 for selective interconnection with a positioning grip 340 as described above. In operation, the arms 308 are deployed from the dock 304 and the fingers 312 are rotated away from the arms 308 to a second position of use shown in FIG. 47. As will be described in further detail below, the arms are spring-biased with respect to the dock 304 such that the provided spring force maintains the selective engagement of the curled portions 328 of the fingers onto the edges of the electronic device 6.

Figure 43:
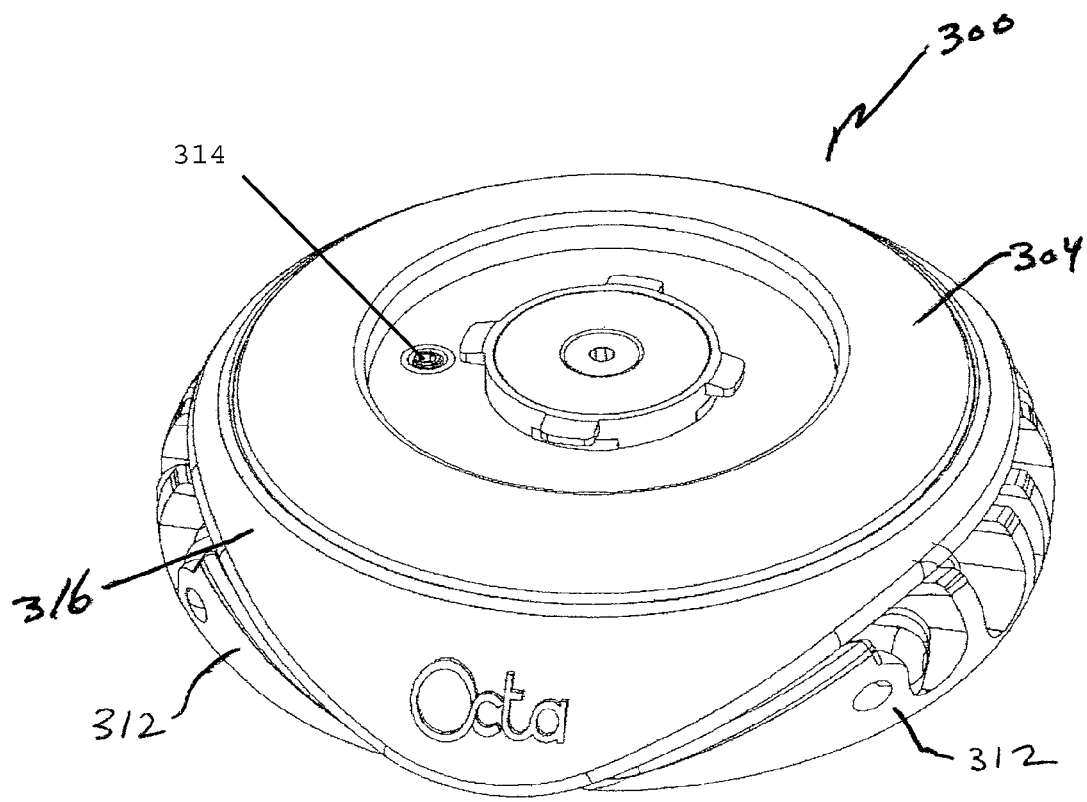
FIG. 43 is a perspective view of an electronic interface of another embodiment of the present invention shown with arms stored in the electrical device interface.
Figure 44:
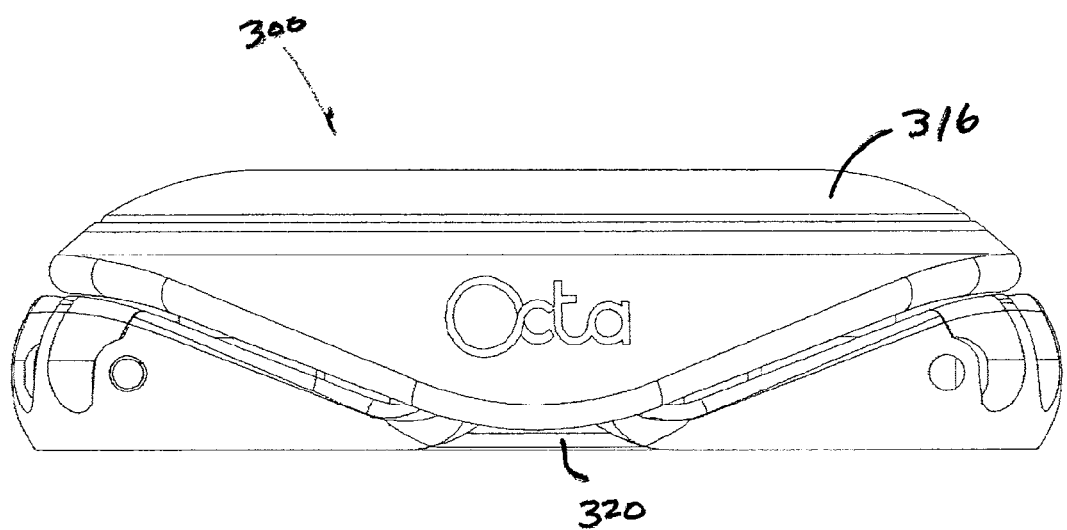
FIG. 44 is a front view of the embodiment shown in FIG. 43.
Figure 45:
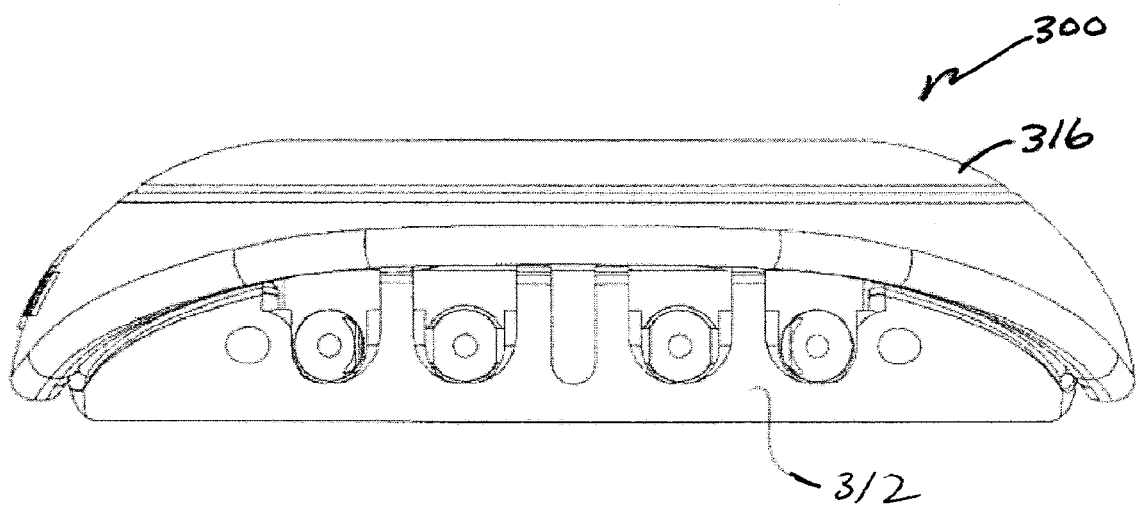
FIG. 45 is a side elevation view of the embodiment shown in FIG. 43.
Figure 46:
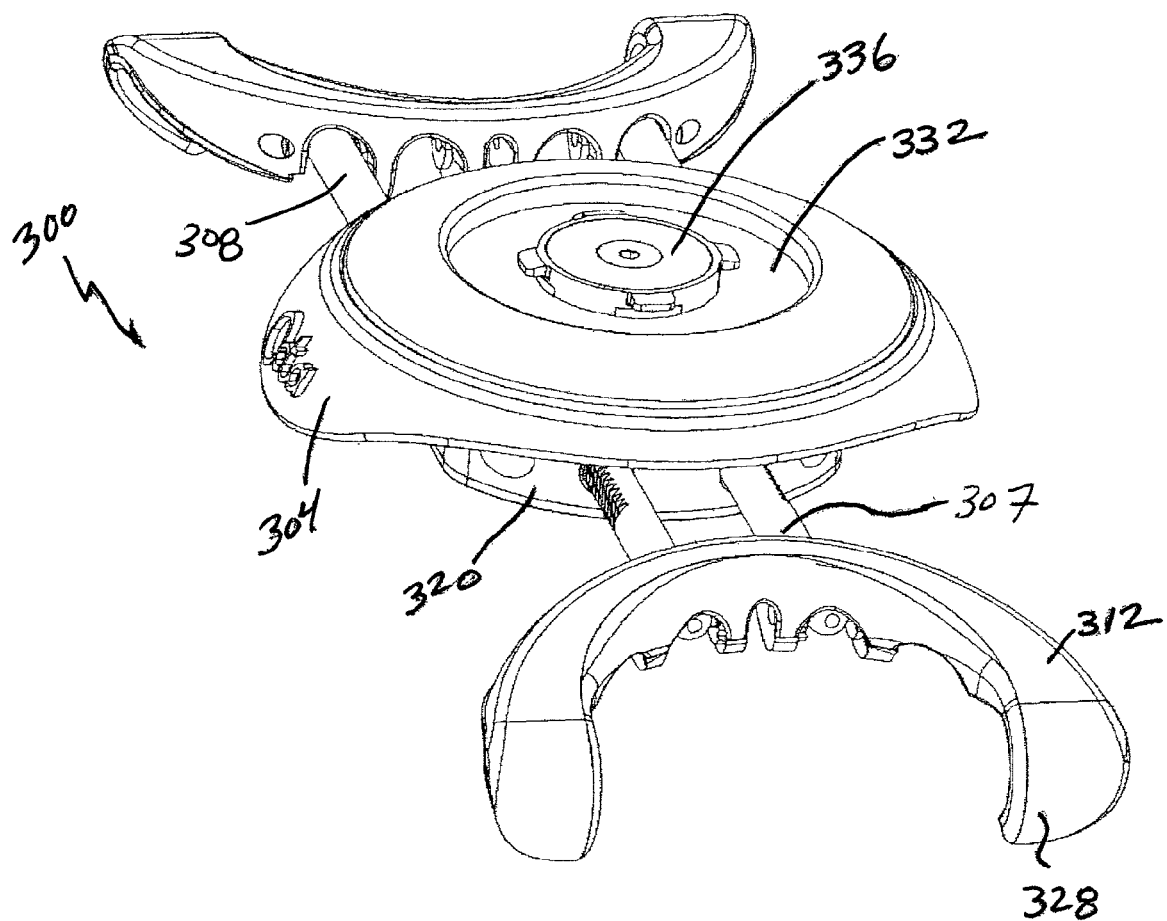
FIG. 46 is a perspective view of the electronic device interface of FIG. 43 shown with arms deployed.
Figure 47:
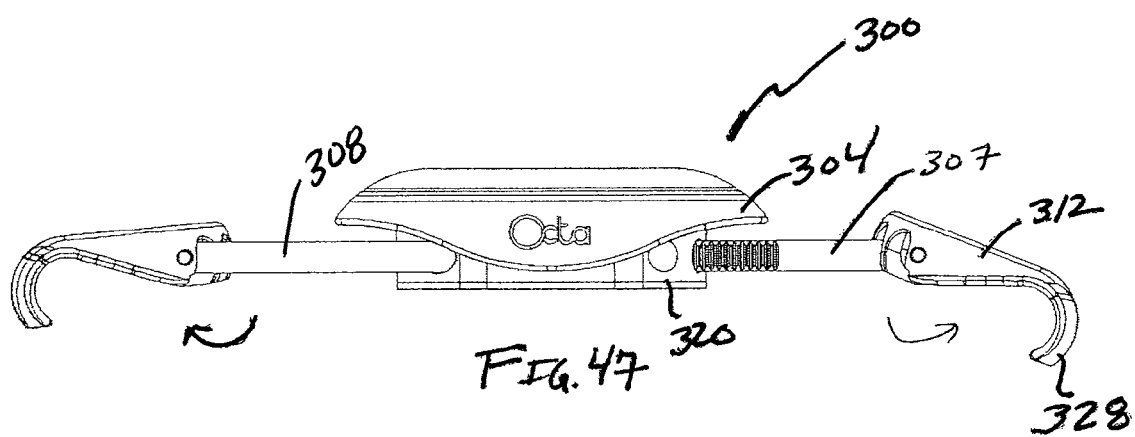
FIG. 47 is a front elevation view of FIG. 46.
Figure 48:
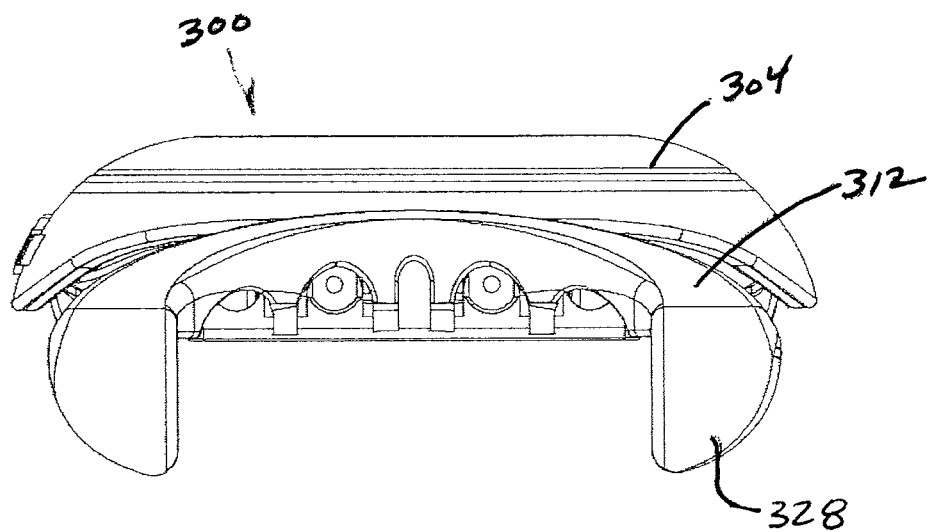
FIG. 48 is a side elevation view of FIG. 46.
Figure 49:
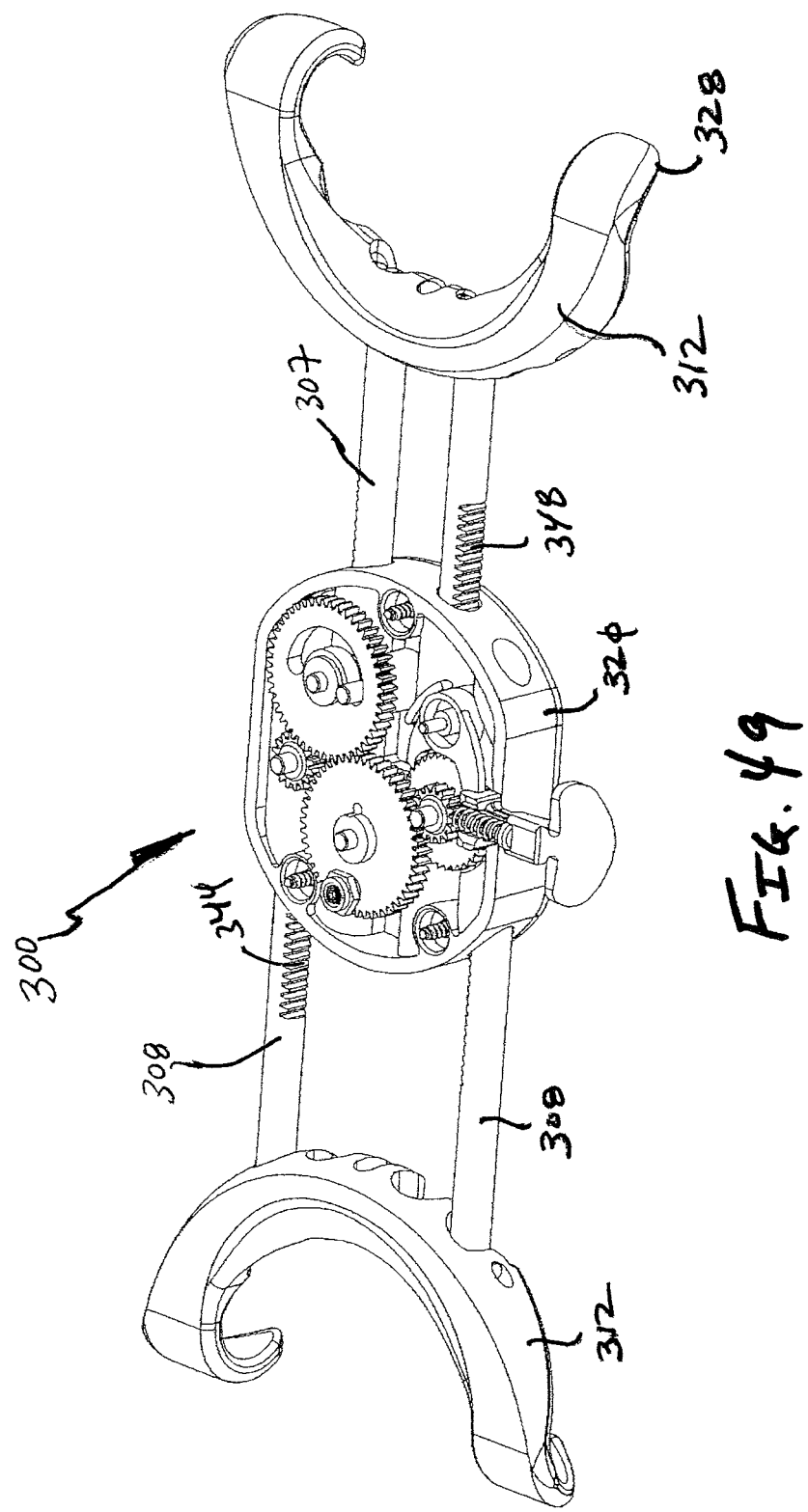
FIG. 49 is a perspective view of the embodiment shown in FIG. 43, wherein a top portion of the electronic device interface has been removed for clarity.
Figure 50:
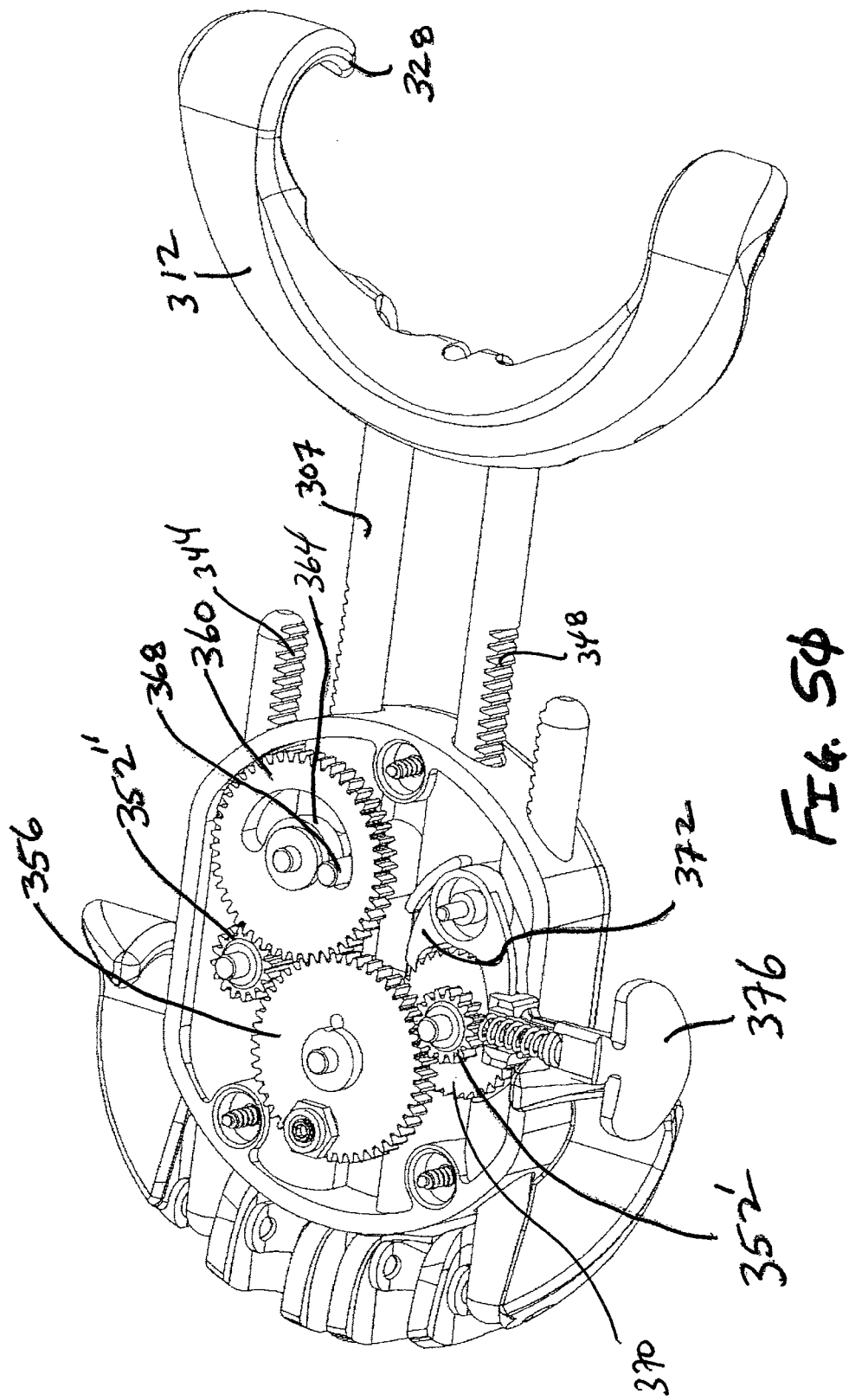
FIG. 50 is a perspective view similar to that of FIG. 49 wherein one arm has been retracted such that a finger has been rotated to a position adjacent to a bottom portion of the electronic device interface.
Figure 51:
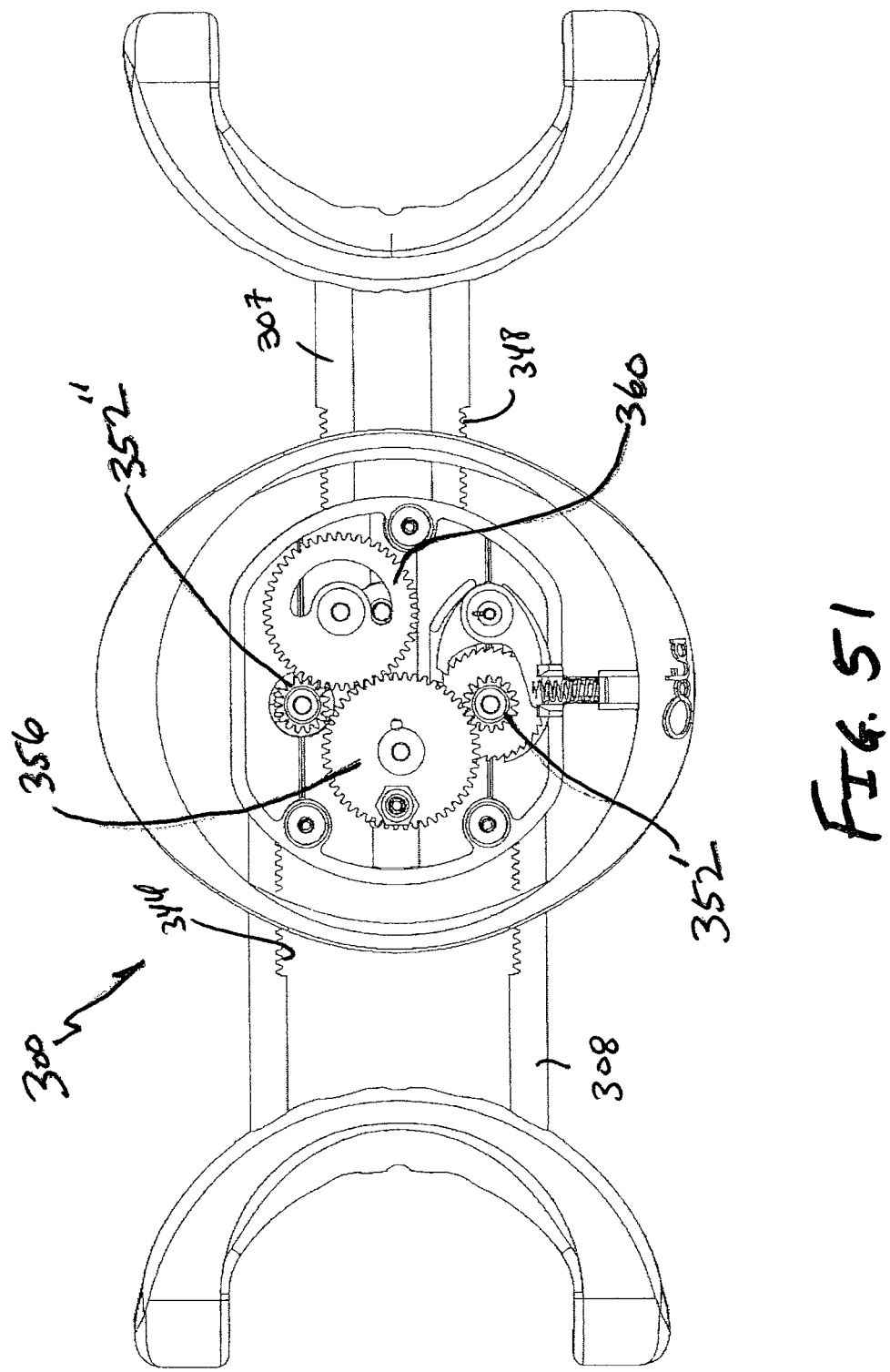
FIG. 51 is a top elevation view of FIG. 49.
Figure 52:
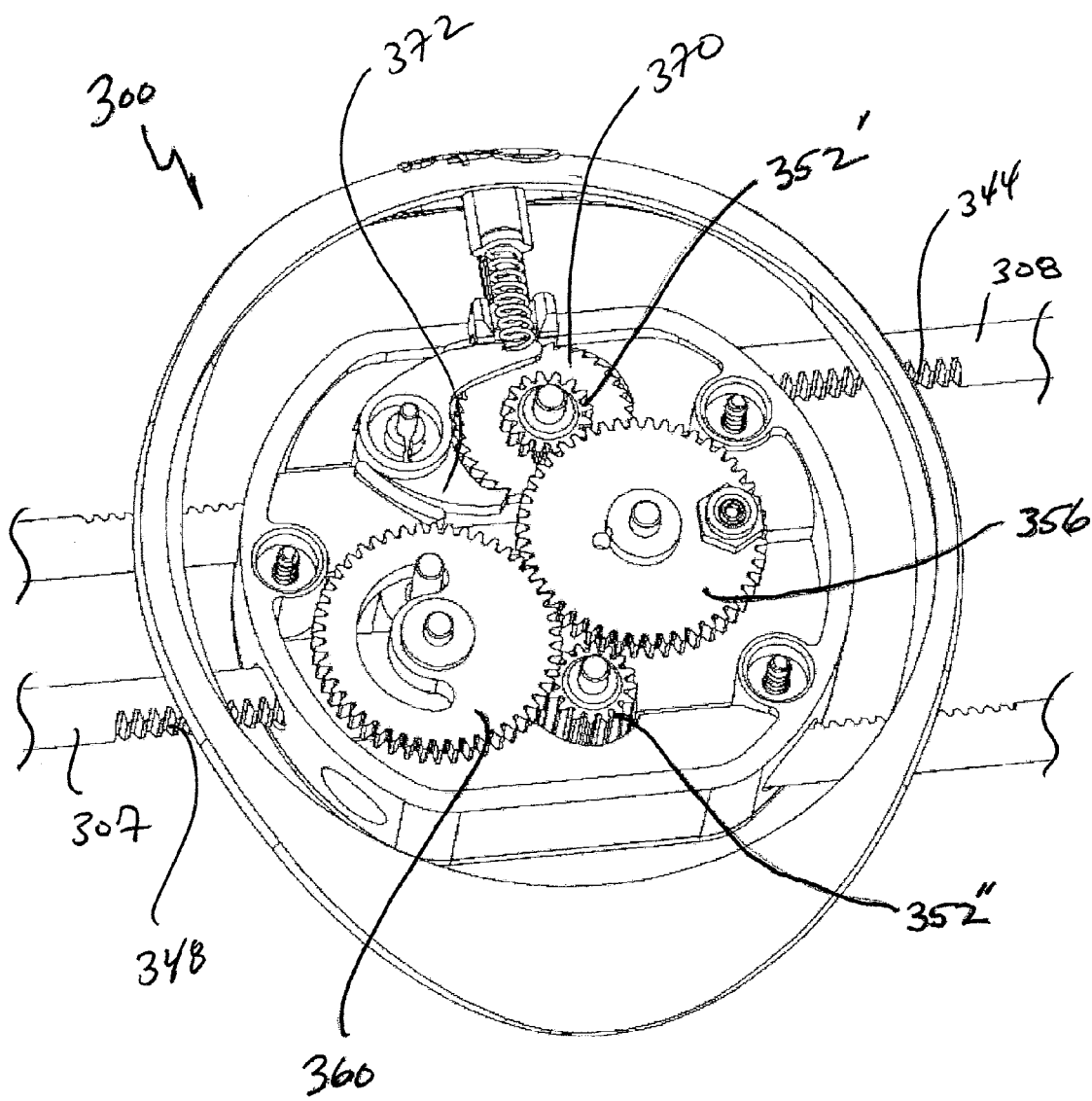
FIG. 52 is a detailed view of FIG. 51.

Referring now specifically to FIGS. 49-52, the internal components of the embodiment shown in FIG. 43, are shown. The inner arms 307 and outer arms 308 include teeth 344 and 348 that engage gears within the dock 304. The gears associated with the inner arms 307 and/or the outer arms 308 are associated with a torsion spring that are used to eject the inner arms 307 and outer arms 308 from the dock 304. The springs are disposed to urge the arms 307 and 308 and associated fingers 312 to a position away from the dock 304. The spring-loaded gear 356 is also operably interconnected to two pinion gears 352 and a limiting gear 360. The limiting gear 360 may have a channel 364 that selectively engages a stop 368 to limit the extension and retraction of the arms 307 and 308.

In operation, the user pushes the button 376 and the fingers 312 are ejected from the dock via the spring force provided by the spring-loaded gear 356. More specifically, the spring-loaded gear 356 rotates a pinion gear 352' and a limit gear 360, which also rotates the other pinon gear 352". The pinion gears 352 are also intermeshed with the teeth 344 and 348 on the arms 307 and 308. Rotation of the pinon gears 352 forces the arms outwardly from the dock. Movement of the arms toward the dock (which will be detailed below) rotates the pinion gears 352 and the spring-loaded gear 356 in an opposite direction. The user then rotates the fingers 312 from a first position of use shown on the left side of FIG. 50, to a second position of use, shown on the right side of FIG. 50, to place the curled portions 328 of the fingers 312 in an orientation adapted to receive the outer edge of the electronic device. After the curled portions 328 are extended beyond the edge of the electronic device 6, the user moves the fingers towards the dock.

One of the pinion gears 352' is associated with a ratchet gear 370 which has teeth that selectively engage a locking pawl 372. As the arms 307 and 308 are moved towards the dock, pinon gear 352' will rotate causing the ratchet gear 370 and the spring-loaded gear 356 to rotate. In addition, pinion gear 352" will cause the limiting gear 360 and the spring-loaded gear 356 to rotate. Rotation of the spring-loaded gear 356 in this fashion loads the spring. A locking pawl 372 controls the rotational movement of the ratchet gear 370 and prevents reverse extension of the arms which locks position of the fingers and arms relative to the electronic device 106. Depression of the button 376 releases the pawl 372 which allows the arms to be extended from the dock as described above. As described above, a positioning grip, if not already installed onto the dock, may be installed thereto.

To remove the interface 300 from the electronic device, the pawl is released from the ratchet gear 370 upon movement of the button 376 toward the dock. After the gears are free to rotate, the user can move the fingers away from the edge of the electronic device, which allows the fingers to retract in a direction towards the dock. Then, the user rotates the fingers back into the position shown on the left side of FIG. 50 and presses the arms back into the dock which loads the spring gear system.

Figure 53A:
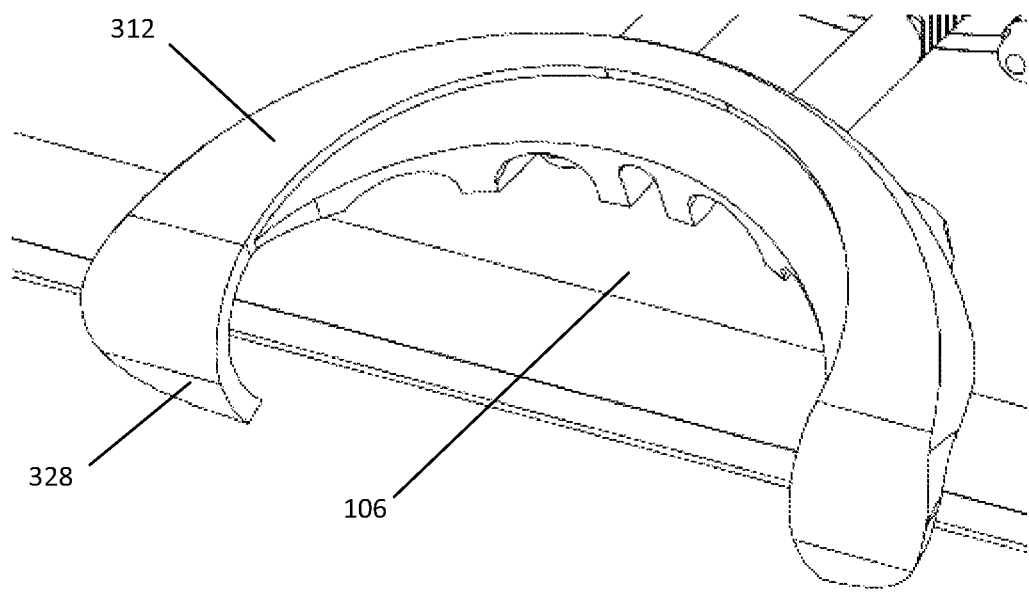
FIG. 53A is a detailed perspective view of FIG. 53.
Figure 53B:
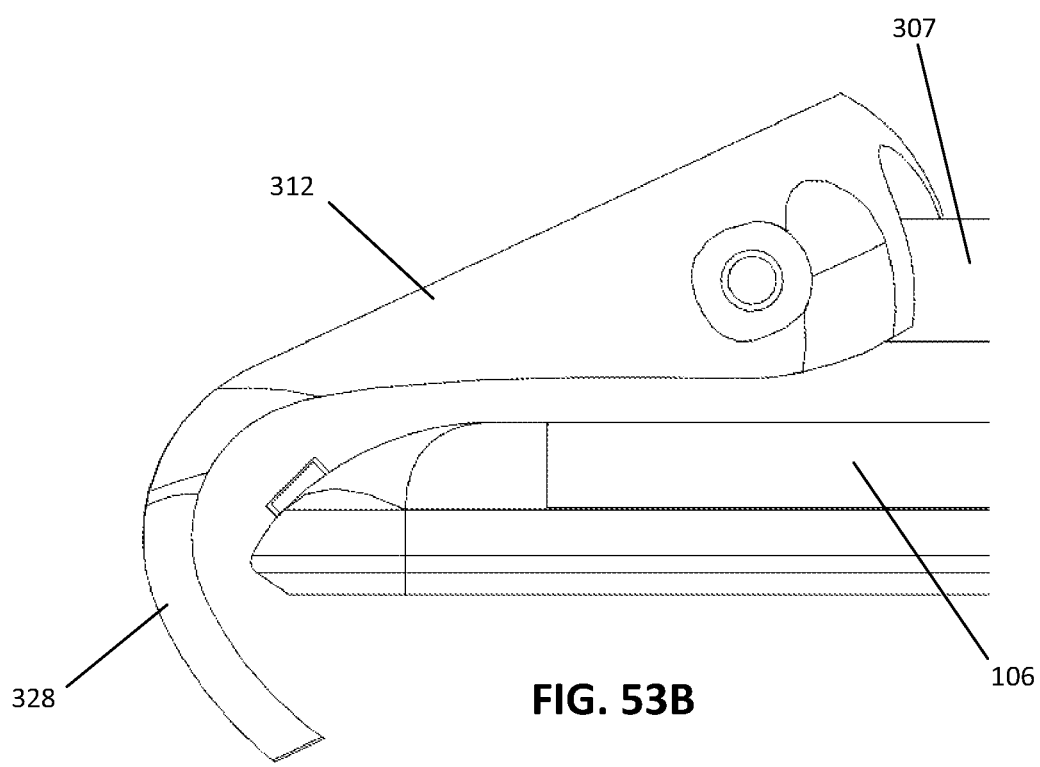
FIG. 53B is a front elevation view of FIG. 53A.

FIGS. 53-53B show the embodiment of FIG. 43 interconnected to an electronic device 106. Further, a selectively adjustable positioning grip 340 is shown interconnected to the dock 304 that provides a plurality of holding and support locations. The fingers 312 of one embodiment of the present invention have a curled portion 328 that is shaped somewhat like a bird's beak. That is, when interconnected to the edge of the electronic device 106, the curled portion 328 a portion of the fingers 312 are positioned adjacent to the front surface of the electronic device 106.

Figure 54:
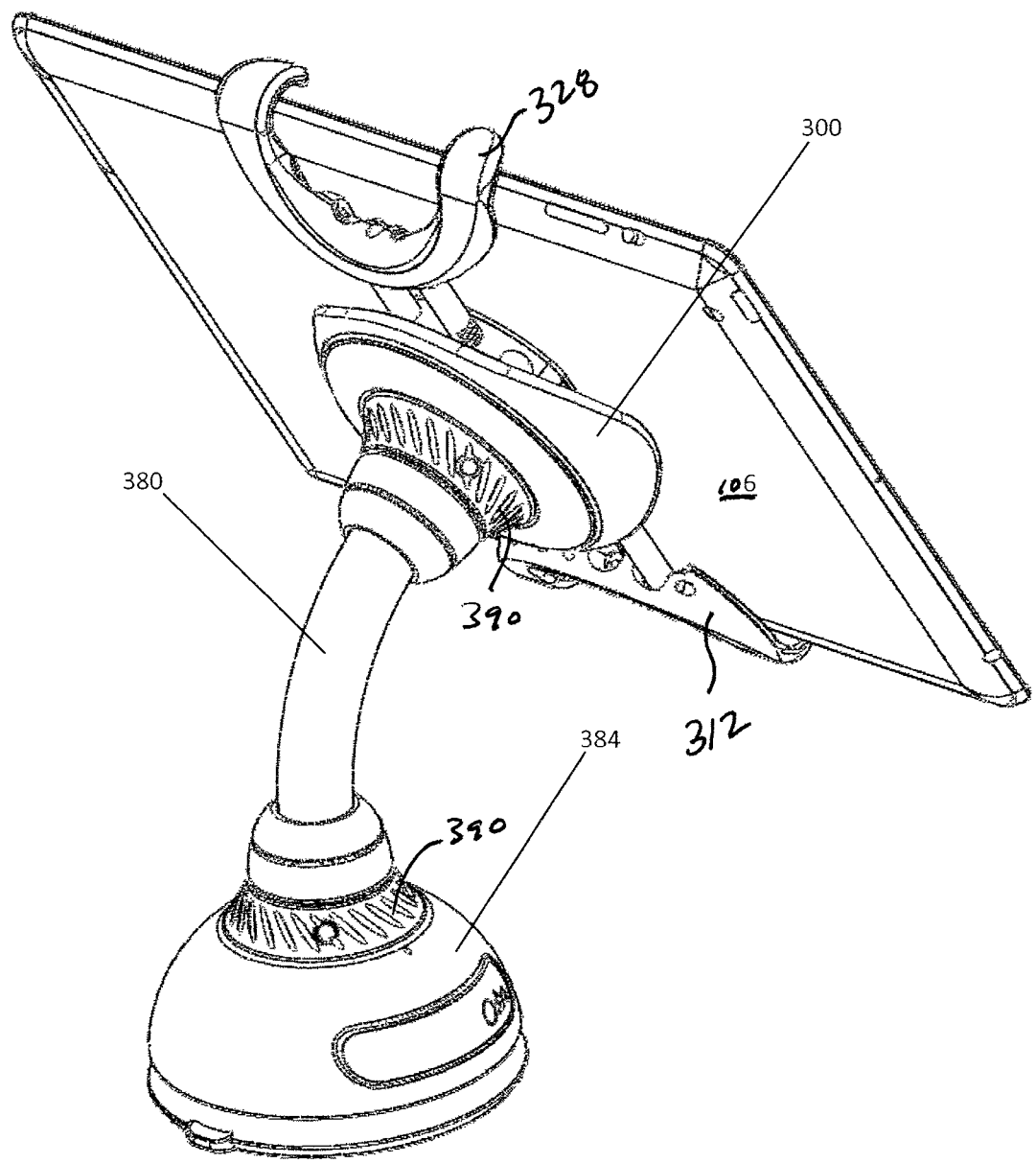
FIG. 54 is a perspective view showing the electronic device interface interconnected to an electronic device and further interconnected to a selectively positionable member that is affixed to a base associated with a horizontal surface.

FIG. 54 shows one way of using the electronic device interface 300 of embodiments of the present invention. Here, the electronic device interface 300 interconnects to an electronic device 106. An elongated selectively adjustable member 380 is interconnected on one end to the electronic device interface 300 and on another end to a device for supporting interconnected to a horizontal surface. Here, the device for supporting is a dock 384 that is held by suction onto a table. One of skill in the art will appreciate that the elongated selectively adjustable member 380 may also be alternatively interconnected to a clamp or any other device. In this configuration, the device can be used as a podium, computer monitor, etc. In addition, the adjustable member 380 is interconnected to the device interface 300 and/or the dock 384 via a locking ring 390 that limits interface 300 and dock 384 tilt.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A device for selectively positioning an electronic device, comprising:

a dock having a top portion and a bottom portion, said top portion and said bottom portion define a partially enclosed volume;

a first arm operatively interconnected to said dock, said first arm having a first position of storage and a second position of use, wherein said first arm is substantially received in said partially enclosed volume in said first position of storage, and said first arm is substantially extended from said partially enclosed volume in said second position of use;

a second arm operatively interconnected to said dock, said second arm having a first position of storage and a second position of use, wherein said second arm is substantially received in said partially enclosed volume in said first position of storage, and said second arm is substantially extended from said partially enclosed volume in said second position of use;

a first finger rotatably interconnected to said first arm, said first finger having a distal end, wherein said distal end of said first finger is positioned inside said partially enclosed volume when said first arm is in said first position of storage, and said distal end of said first finger is positioned outside said partially enclosed volume when said first arm is in said second position of use;

a second finger rotatably interconnect to said second arm, said second finger having a distal end, wherein said distal end of said second finger is positioned inside said partially enclosed volume when said second arm is in said first position of storage, and said distal end of said second finger is positioned outside said partially enclosed volume when said second arm is in said second position of use; and wherein said dock has a first position of storage wherein said first arm and said second arm are in said first position of storage, and wherein said dock has a second position of use wherein said first arm and said second arm are in said second position of use such that said top portion of said dock is adapted to be engaged onto or adjacent to a back surface of an electronic device, and said first finger and said second finger are configured to selectively interconnect to an edge of an electronic device.

2. The device of claim 1, wherein: said first finger is rotated toward said first arm when said first arm is in said first position of storage, and said first finger is rotated away from said first arm when said first arm is in said second position of use; and said second finger is rotated toward said second arm when said second arm is in said first position of storage, and said second finger is rotated away from said second arm when said second arm is in said second position of use.

3. The device of claim 2, wherein: said first finger is positioned substantially parallel to said first arm when said first arm is in said first position of storage; and said second finger is positioned substantially parallel to said second arm when said second arm is in said first position of storage.

4. The device of claim 1, wherein:
said distal end of said first finger is curled; and
said distal end of said second finger is curled.

5. The device of claim 1, wherein said first finger and said second finger include a resiliently deflectable material.

6. The device of claim 1, further comprising:
a pawl operably interconnected to at least one of said first arm and said second arm, wherein said pawl controls the movement of said fist arm and said second arm to prevent extension of said first arm and said second arm;

a button disposed on said dock, wherein engagement of said button causes said pawl to disengage from said at least one of said first arm and said arm, wherein a spring-loaded gear allows said first arm and said second arm to extend from said dock; and
a lock disposed on said dock, wherein engagement of said lock fixes the position of said first arm and said second arm relative to said dock.

* * * * *